(12) United States Patent
Sreenivas

(10) Patent No.: US 9,007,043 B2
(45) Date of Patent: Apr. 14, 2015

(54) PARAMETER ADJUSTMENT DEPENDING ON RESONANT FREQUENCY OF A POWER SUPPLY

(75) Inventor: Venkat Sreenivas, Winchester, MA (US)

(73) Assignee: International Rectifier Corporation, El Segundo, CA (US)

( * ) Notice: Subject to any disclaimer, the term of this patent is extended or adjusted under 35 U.S.C. 154(b) by 621 days.

(21) Appl. No.: 13/309,378

(22) Filed: Dec. 1, 2011

(65) Prior Publication Data

US 2012/0139513 A1    Jun. 7, 2012

Related U.S. Application Data

(63) Continuation-in-part of application No. 12/816,744, filed on Jun. 16, 2010, now Pat. No. 8,461,816.

(60) Provisional application No. 61/308,228, filed on Feb. 25, 2010.

(51) Int. Cl.
*G05F 1/00* (2006.01)
*H02M 3/156* (2006.01)

(52) U.S. Cl.
CPC ............ *H02M 3/156* (2013.01); *Y02B 70/1425* (2013.01)

(58) Field of Classification Search
CPC .................... H02M 2001/0058; H02M 3/1584
USPC ........ 363/16, 65, 71; 323/225, 271, 272, 284, 323/285, 350
See application file for complete search history.

(56) References Cited

U.S. PATENT DOCUMENTS 6,487,095 B1 * 11/2002 Malik et al. ...................... 363/25
8,232,782 B2 * 7/2012 Houston et al. ............... 323/272

* cited by examiner

*Primary Examiner* — Adolf Berhane
*Assistant Examiner* — Jye-June Lee
(74) *Attorney, Agent, or Firm* — Chapin IP Law, LLC

(57) ABSTRACT

According to example configurations herein, a controller receives a value indicative of a number of phases in a power supply to be activated for producing an output voltage to power a load. A resonant frequency of the power supply changes depending on the number of phases activated. According to one configuration, a controller utilizes the value to proportionally adjust at least one control parameter associated with the power supply in accordance with a change in the resonant frequency. In addition to modifying a parameter based on the number of activated phases and/or the resonant frequency of the power supply, the controller can also use the value of the input voltage as a basis to adjust at least one control parameter. Moreover, according to one example configuration, the controller digitally computes values for the at least one control parameter based on a number of phases to be activated.

22 Claims, 19 Drawing Sheets

PARAMETER ADJUSTMENT DEPENDING ON RESONANT FREQUENCY OF A POWER SUPPLY

RELATED APPLICATIONS

This application is a continuation in part of and claims priority to filed U.S. patent application Ser. No. 12/816,744 entitled "Coefficient Scaling Depending on Number of Active phases," filed on Jun. 16, 2010 now U.S. Pat. No. 8,461,816, the entire teachings of which are incorporated herein by this reference.

U.S. patent application Ser. No. 12/816,744 is related to and claims the benefit of earlier filed U.S. Provisional Patent Application Ser. No. 61/308,228 entitled "Voltage Regulator Control Coefficient Scaling for Stability and Optimal Performance," filed on Feb. 25, 2010, the entire teachings of which are incorporated herein by this reference.

BACKGROUND

Conventional voltage regulators typically can control activation of one or more phases to produce an output voltage. Operating a different number of phases depending on line and/or load conditions can increase an efficiency of a respective power supply.

For example, if a load consumes relatively low current, it may be beneficial to operate as few as a single phase of a power supply to supply the appropriate current to the load. Deactivating one or more phases when they are not needed can increase efficiency because of the minimal overhead power that is associated with operating only a single phase. When off, each of the deactivated phases typically does not consume overhead power.

For heavier loads that consume more power, it is usually beneficial to operate multiple phases because a single phase may not be able to produce enough current to power the load. When operating with multiple active phases, each of the multiple phases produces some portion of current that is consumed by the load.

A controller is typically configured to control the phases in the power supply based on control settings. Certain conventional analog power supplies use an external network of capacitors and resistors to form a so-called compensation network. A compensation network serves as control settings to configure a controller. It is there to ensure an optimal combination of stability and responsiveness (loop bandwidth).

To change control settings of a controller, different compensation networks can be switched into or out of a respective network depending on a number of operating phases. For example, a first network can provide first compensation when a single phase is activated. A second network can provide a second compensation for the power supply when a group of two or more phases are activated.

BRIEF DESCRIPTION

Conventional applications such as those as discussed above can suffer from a number of deficiencies. For example, providing multiple different physical compensation networks for changing settings of a controller is undesirable because they are cumbersome to use and physically increase a size of a respective control circuit.

Additionally, such conventional implementations are typically inefficient. For example, switching the physical networks in and out of a power supply circuit does not provide a fine level of compensation control on a per-phase basis. In other words, according to conventional techniques, a same compensation network is used in a control circuit of a power supply regardless of whether two, three, four, etc., phases are activated. Accordingly, in such a conventional implementation, because the control settings do not change as more phases are added, the operation of the power supply can become very inefficient and have poor regulation or transient response (low loop bandwidth)

An alternative to switching multiple compensation networks as discussed above is to implement one compensation network to handle a variety of conditions such as when a single phase is activated or when two or more of the phases are activated. This single compensation network solution is simple to implement, but may severely limit a performance of the voltage regulator and its ability to efficiently provide power the load.

Embodiments herein include a novel, automated way of scaling control coefficients in a switching voltage regulator. Scaling of control coefficients as discussed herein can provides increased stability and improved transient performance for different types of operating conditions.

For example, one embodiment herein includes a controller. The controller receives a value indicative of a number of phases in a power supply to be activated for producing an output voltage to power a load. The controller utilizes the received value to adjust a magnitude of one or more control coefficients associated with the power supply. In one embodiment, the controller digitally computes values for the one or more control coefficients based on the number of phases in the power supply that are to be activated. Based on the adjusted magnitudes of the one or more control coefficients, the controller produces control signals to control the active phases in the power supply. Accordingly, embodiments herein can include scaling gain coefficients associated with a power supply based on a number of phases to be activated or based on a number of currently active phases.

In one embodiment, the controller can adjust the control coefficients in response to detecting a change in the number of phases to be activated. For example, in response to detecting that the power supply needs to operate with either more or less phases in the future, the controller can mathematically compute new settings for one or more one control coefficients based on the received value.

Modification of the control coefficients can vary depending on the application. For example, in one embodiment, the controller can be configured to proportionally reduce or increase the magnitude of one or more control coefficients by an amount as specified by the value indicative of the number of phases to be activated.

In accordance with further embodiments, the controller can include a PID compensator circuit. In such an embodiment, the controller proportionally adjusts a gain coefficient inputted to the PID compensator in response to detecting a change in the value. As an example, the controller can initiate adjusting one or more gain coefficients inputted or applied to the PID compensator circuit in response to detecting that subsequent operation of the power supply will include activating a different number of phases to produce the output voltage. As mentioned, the number of active phases in the power supply can change over time to account for different loads. As the number of active phases changes, the controller adjusts the gain coefficients inputted to the PID compensator circuit to adjust the characteristics of the power supply.

The PID compensator circuit can include a number of functions such as a proportional function, an integrator function, and a differential function. Each of these functions can be configured to receive an error signal indicative of a difference between the output voltage of the power supply and a desired setpoint. By adjusting gain coefficients inputted to the PID compensator circuit, the controller as discussed herein can control a gain associated with one or more the functions depending on a number of active phases in the power supply. As an example, the controller can adjust the gains for each of the functions (such as proportional function, integrator function, and differential function) depending on how many of the phases are activated in the power supply to power the load.

In one embodiment, the controller produces a summation output by summing outputs of each of the functions in the PID compensator circuit. The controller inputs the summation value outputted by the PID compensator circuit into a filter circuit such as a low pass filter circuit. The controller can utilize an output of the filter circuit to produce the control signals used to control respective control (e.g., high side switch circuitry) and synchronous switches (e.g., low side switch circuitry) in each of the active phases.

In one embodiment, the controller adjusts or scales the settings (e.g., one or more poles) associated with the filter circuit based on the value indicative of the number of phases to be activated. For example, the controller can adjust the setting of the gain coefficients inputted to PID compensator circuit. Additionally, the controller can adjust a parameter such as a cutoff frequency of the filter depending on how many phases are activated.

In further embodiments, in addition to adjusting coefficients and/or filter settings based on the number of active phases in the power supply, note that the gain coefficients of the PID compensation circuit also can be adjusted depending on a magnitude of the input voltage converted into the output voltage via the power supply. For example, the power supply can be configured to convert the input voltage into an output voltage. In such an embodiment, the controller can receive a value indicative of a magnitude of the input voltage that is converted by the power supply into the output voltage. Based on a magnitude of the input voltage, the controller adjusts one or more of the gain coefficients. Accordingly, the gain coefficients inputted to the PID compensator circuit can be adjusted based on multiple parameters such as input voltage, number of activated phases, etc.

Adjusting the control or gain coefficients is useful over conventional techniques. For example, in one embodiment, the controller can control an open loop gain of the power supply over a range of different activated phases by adjusting the magnitude of the one or more gain coefficients depending on the number of phases that are activated to produce the output voltage.

In further embodiments, the controller adjusts a magnitude of one or more gain coefficients of the PID compensator circuit based on the received value so that the crossover frequency of the power supply is substantially fixed or relatively constant regardless of the number of phases that are activated to produce the output voltage.

In an alternative embodiment, the controller adjusts a magnitude of at least one gain coefficient in the power supply based on the value so that the crossover frequency of the power supply increases as additional phases are activated to produce the output voltage.

These and other more specific embodiments are disclosed in more detail below.

The embodiments as described herein are advantageous over conventional techniques. For example, the embodiments as discussed herein are applicable to switching voltage regulators with a buck topology for application to low voltage processors, memory, digital ASICs, etc. The concepts disclosed herein, however, are applicable to other suitable topologies such as boost regulators, buck-boost regulators, etc.

Note that embodiments herein can include a controller configuration of one or more processor devices to carry out and/or support any or all of the method operations disclosed herein. In other words, one or more computerized devices or processors can be programmed and/or configured to operate as explained herein to carry out different embodiments of the invention.

Yet other embodiments herein include software programs to perform the steps and operations summarized above and disclosed in detail below. One such embodiment comprises a computer program product that has a non-transitory computer-storage medium (e.g., memory, disk, flash, ...) including computer program logic encoded thereon that, when performed in a computerized device having a processor and corresponding memory, programs the processor to perform the operations disclosed herein. Such arrangements are typically provided as software, code and/or other data (e.g., data structures) arranged or encoded on a computer readable storage medium or non-transitory computer readable media such as an optical medium (e.g., CD-ROM), floppy or hard disk or other a medium such as firmware or microcode in one or more ROM or RAM or PROM chips, an Application Specific Integrated Circuit (ASIC), etc. The software or firmware or other such configurations can be installed onto a controller to cause the controller to perform the techniques explained herein.

Accordingly, one particular embodiment of the present disclosure is directed to a computer program product that includes a computer readable medium having instructions stored thereon for supporting operations such as controlling phases in a power supply. For example, in one embodiment, the instructions, when carried out by a processor, cause the processor in a monitor resource to: receiving a value indicative of a number of phases in a power supply to be activated for producing an output voltage to power a load; utilizing the value to adjust a magnitude of at least one control coefficient associated with the power supply; and based on the adjusted magnitude of the at least one control coefficient, producing control signals to control the number of phases in the power supply as specified by the value to produce the output voltage.

The ordering of the steps has been added for clarity sake. These steps can be performed in any suitable order.

According to further example configurations herein, a controller generates a value indicative of a number of phases in a power supply to be activated for producing an output voltage to power a load. A resonant frequency of the power supply changes depending on the number of phases activated.

According to one configuration, the controller utilizes the value (e.g., number of phases to be activated) as a basis to proportionally adjust at least one control parameter associated with the power supply in accordance with a change in the resonant frequency in one embodiment, When switching from activating a first number of phases to a second number of phases, the resonant frequency of the power supply varies in relation to the scale factor $1/\sqrt{n}$. One or more control parameters can be varied depending on a scale factor of $1/\sqrt{n}$ or $\sqrt{n}$, where n=number of phases activated.

In addition to modifying a parameter based on the number of activated phases and/or the resonant frequency of the power supply, the controller also can use the value of the input voltage as a basis to adjust at least one control parameter. Moreover, according to one example configuration, the controller can be configured to digitally compute values for the at least one control parameter based on the number of phases to be activated.

Thus, one or more parameter settings of a respective power supply control circuit can scale or be adjusted depending on a change in the resonant frequency of the power supply. In other words, using the scale factor $1/\sqrt{n}$, $1/n$ and/or $\sqrt{n}$ where n=the number of activated phase, a parameter adjustment circuit as discussed herein proportionally adjusts one or more control settings in a power supply control circuitry to account for a change in the resonant frequency resulting from activating the number of phases as specified by the value.

More specifically, according to one embodiment, a control parameter adjustment circuit receives a value indicative of a number of phases to activate in a power supply that produces an output voltage to power a load. As mentioned, a resonant frequency of the power supply can vary depending on the number of phases that are activated. The parameter adjustment circuitry utilizes the value as a basis to proportionally adjust one or more power supply control settings of the power supply in accordance with a setting of the resonant frequency. Based on the proportionally adjusted at least one power supply control setting, a power supply control circuitry produces control signals to control the phases in the power supply.

In one embodiment, the parameter adjustment circuit proportionally adjusts a magnitude of the at least one power supply control setting by a factor of 1 divided by a square root of the value, n.

In accordance with another embodiment, the parameter adjustment circuit proportionally adjusts a cutoff frequency of at least one filter circuit in the power supply by a factor of square root of the value, n, to track a change in the resonant frequency resulting from activating the number of phases as specified by the value.

In accordance with yet another embodiment, the parameter as discussed herein circuit proportionally adjusts a setting of a pole in at least one filter circuit in the power supply by a factor of square root of the value n to track a change in the resonant frequency resulting from activating the number of phases as specified by the value.

The power supply as discussed herein can include a PID circuit (e.g., PID compensator). In such an embodiment, the parameter adjustment circuit can be configured to proportionally adjust a gain associated with a proportional function in a PID compensator based on a change in the resonant frequency of the power supply resulting from activation of the number phases. For example, in one embodiment, the proportional function in the PID produces a first signal (e.g., a P signal). The parameter adjustment circuit utilizes the value to adjust a gain associated with a differential function in the PID compensator; the differential function produces a D signal. The power supply control circuitry produces a sum based on summing at least the P signal and the D signal from the PID circuit. The power supply control circuitry inputs the sum into a filter circuit. The parameter adjustment circuit adjusts a setting of a pole of the filter circuit based on an inverse square root of the value, n. A control signal generator utilizes an output of the filter circuit to produce the control signals to generate the output voltage to power the load.

In accordance with another embodiment, the parameter adjustment circuit proportionally adjusts an open loop gain portion of the power supply in accordance with a setting of the resonant frequency of the power supply.

Embodiments herein also or alternatively can include adjusting a magnitude of at least one gain coefficient in the power supply based on the value so that the crossover frequency of the power supply increases for an increased number of phases that are activated to produce the output voltage.

In accordance with another embodiment, a power supply controller utilizes a first setting of a power supply control circuitry to activate a first number of phases in a power supply to produce an output voltage to power a load. In response to receiving a command to activate a second number of phases in the power supply to produce the output voltage to power the load, a parameter adjustment circuit in the power supply control circuitry modifies the first setting to configure the power supply control circuitry according to a second setting. The modification can include proportionally adjusting at least one setting of the power supply control circuitry based on an amount that a resonant frequency of the power supply changes due to activating the second number of phases in lieu of activating the first number of phases. The power supply control circuitry utilizes the second setting of the power supply control circuitry to activate the second number of phases in the power supply to produce the output voltage to power the load.

It is to be understood that the system, method, apparatus, etc., as discussed herein can be embodied strictly as hardware, as a hybrid of software and hardware, or as software alone such as within a processor, or within an operating system or a within a software application. Example embodiments of the invention may be implemented within products and/or software applications such as those developed or manufactured by International Rectifier Corporation of El Segundo, Calif., USA.

Additionally, note that although each of the different features, techniques, configurations, etc., herein may be discussed in different places of this disclosure, it is intended, where appropriate, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

Embodiments herein include a unique and cost effective implementation of a power supply and/or respective control circuit.

For example, a controller can receive a value indicative of a number of phases in a power supply to be activated for producing an output voltage to power a load. The controller utilizes the value to adjust a magnitude of one or more gain coefficients inputted to a compensator circuit.

The controller digitally computes values for the one or more control coefficients based on the received value indicating the number of phases in the power supply to be activated for producing the output voltage.

The controller can further adjust the gain coefficients inputted to the compensator circuit based on additional inputs such as a magnitude of the input voltage of the power supply that is converted to the output voltage.

During operation, based on a setting of the one or more gain coefficients, the compensator circuit produces an output signal. Based on the output of the compensator circuit, the controller generates controls signals to operate phases in the power supply.

Figure 1:
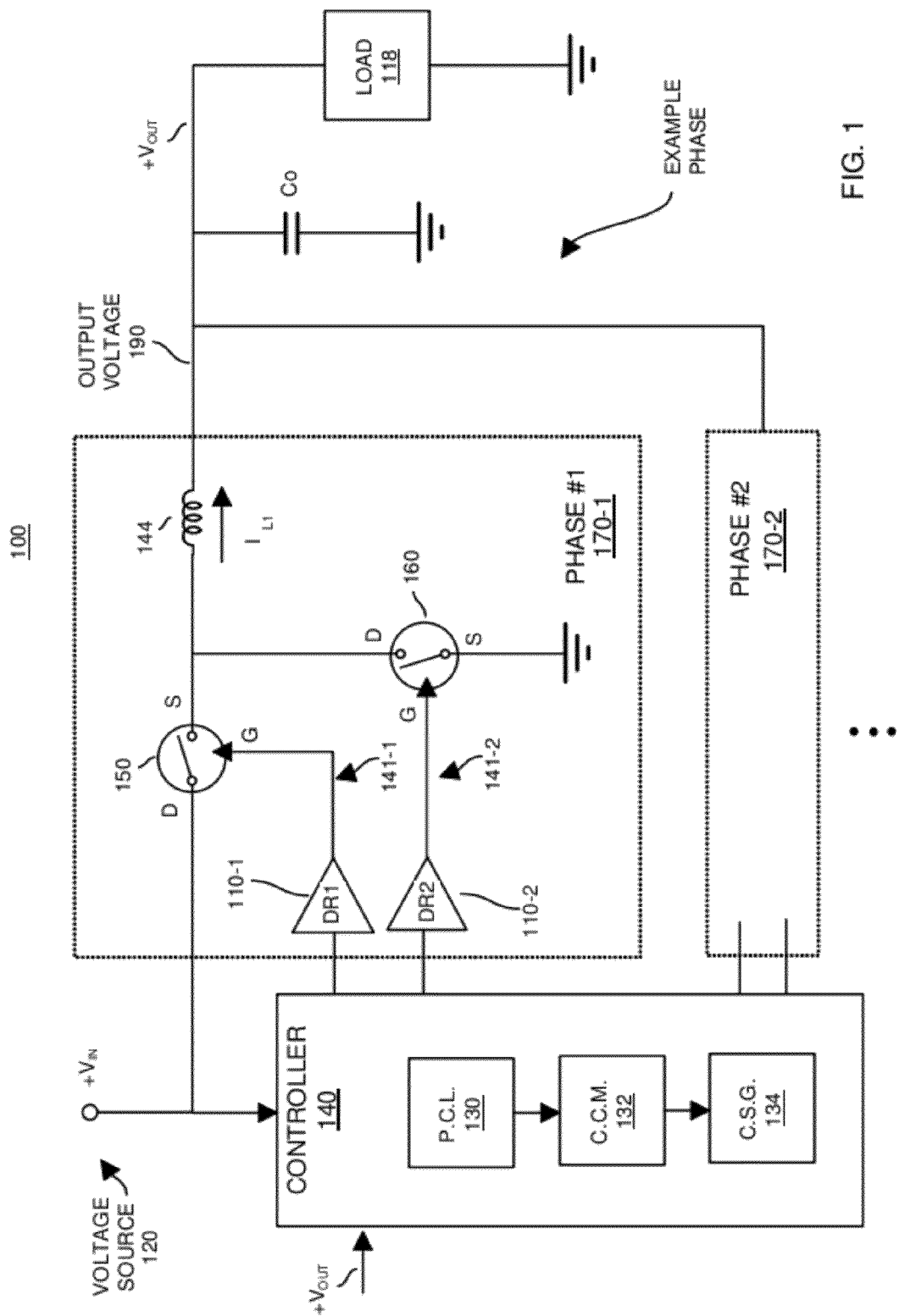
FIG. 1 is an example diagram of a power supply including a control coefficient modifier according to embodiments herein.

FIG. 1 is an example diagram of a power supply 100 according to embodiments herein. As shown, the power supply 100 includes controller 140. Controller 140 controls an operation of power supply 100 and produces output voltage 190 based at least in part on one or more functions such as phase control logic 130, control coefficient modifier 132, and control signal generator 134.

More specifically, according to one embodiment, controller 140 receives inputs or feedback such as Vin, Vout, current provided by each active phase, etc.

Based on operating conditions of power supply 100, the phase control logic 130 in controller 140 generates a value indicating how many phases should be activated to produce output voltage 190. Control coefficient modifier 132 receives the value and modifies control coefficients of the power supply based on a magnitude of the received value. Control signal generator 134 utilizes the modified control coefficients generated by the control coefficient modifier 132 to produce control signals to control the respective phases of the power supply 100.

More specifically, based on the received inputs and configuration settings of controller 100, controller 100 outputs control signals to switch the high side switch 150 and low side switch 160 ON and OFF when a first phase such as phase 170-1 is activated. Switching operation of high side switch 150 and low side switch 160 produces output voltage 190 to power load 118.

In one embodiment, the controller 140 generates signals controlling the driver circuits 110-1 and 110-2. Based on control signals received from the controller 140, driver 110-1 controls a state of high side switch 150 (e.g., a control switch) and driver 110-2 controls a state of low side switch 160 (e.g., a synchronous switch) in power supply 100.

Note that driver circuits 110 (e.g., driver circuit 110-1 and driver circuit 110-2) can be located in the controller 100 or can reside at a remote location with respect to the controller 100.

When high side switch 150 is turned ON (i.e., activated) via control signals generated by controller 100 (while the low side 160 or synchronous switch is OFF), the current through inductor 144 increases via a highly conductive electrical path provided by high side switch 150 between voltage source 120 and inductor 144.

When low side switch 160 is turned ON (i.e., activated) via control signals generated by controller 100 (while the high side switch 150 or control switch is OFF), the current through inductor 144 decreases based on an electrically conductive electrical path provided by the low side switch 160 between the inductor 144 and ground as shown.

Based on proper switching of the high side switch 150 and the low side switch 160, the controller 140 regulates the output voltage 190 within a desired range to power load 118.

In one embodiment, power supply 100 includes multiple phases as shown. Each of the multiple phases can be similar to the example phase 170-1 shown in FIG. 1. During heavier load 118 conditions, the controller 140 initiates activation of multiple phases. For example, during lighter load 118 conditions, the controller activates fewer phases such as a single phase. The controller 100 activates the one or more phases to maintain the output voltage 190 within a desired range to power load 118.

As shown, each phase can include a respective high side switch circuit and low side switch circuit as previously discussed. To deactivate a respective phase, the phase controller 140 can set both high side switch circuitry and low side switch circuitry of the respective phase to an OFF state. When off or deactivated, the respective phase does not contribute to producing current to power the load 118.

The controller 140 can select how many phases to activate depending on an amount of current consumed by the load 118. For example, when the load 118 consumes a relatively large amount of current, the controller 100 can activate multiple phases to power the load 118. When the load 118 consumes a relatively small amount of current, the controller 140 can activate fewer or a single phase to power the load 118.

The phases can be operated out of phase with respect to each other.

Any of multiple different types of methods such as estimations or physical measurements can be implemented in the power supply 100 to detect an amount of current provided by each of the phases or an overall amount of current consumed by the load 118. Such information may be useful in determining how phases should be activated to produce the output voltage 190.

The controller 140 can also monitor other parameters such as a rate of change in a magnitude of the output voltage 190 to determine how many phases will be used to produce the output voltage 190.

As briefly mentioned above, embodiments herein include a system, method, etc., for scaling control coefficients to accommodate a wide range of input voltages and to provide efficient power supply performance regardless of the number of active phases. As discussed herein, the implementation of the control coefficient modifier 132 can be fabricated in relatively few gates in the controller 140 in the controller 140, resulting in a small die area penalty, a vastly simplified power supply circuit board layout, and superior performance of power supply 100 to produce output voltage 190.

As discussed below, the control coefficients utilized by the controller 100 to produce the output voltage 190 can include coefficients such as the proportional (P), integral (I), differential (D), and voltage feedforward (F) coefficients.

The open loop converter transfer function of the active phases can be proportionally adjusted based on a magnitude of the input voltage, Vin. To maintain a same closed loop bandwidth and to maintain stability of the power supply 100 over a range of a different number of active phases, embodiments herein can include digitally dividing so-called P, I, D, and F coefficients (of a PID compensator circuit) by a filtered, digitized input voltage value.

To operate efficiently, the controller 140 adjusts the number of operating or active phases depending on the amount of current that needs to be delivered to the load 118. But changing the number of active phases (without changing the control coefficients) in the power supply can change parameters of the power supply such as the double pole (or resonant frequency) created by the effective inductance and the load capacitance, the open loop gain, the ripple frequency, etc.

To maintain stability of the power supply 100 during operation over a range a different number of activated phases, the controller 140 digitally adjusts or scales the control coefficients as discussed herein.

Note that the controller 140 can be a computer, processor, micro-controller, digital signal processor, etc., configured to carry out and/or support any or all of the method operations disclosed herein. In other words, the controller can include one or more computerized devices, processors, digital signal processor, etc. to operate as explained herein to carry out different embodiments of the invention.

Note that embodiments herein can further include one or more software programs, executable code stored on a computer readable media to perform the steps and operations summarized above and disclosed in detail below. For example, one such embodiment comprises a computer program product that has a computer-storage medium (e.g., a non-transitory computer readable medium or media) including computer program logic (e.g., software, firmware, instructions, . . . ) encoded thereon that, when performed in the controller 140 having a processor and corresponding storage, programs the controller 140 to digitally perform the operations as disclosed herein. Such arrangements can be implemented as software, code, and/or other data (e.g., data structures) arranged or encoded on a computer readable medium such as an optical medium (e.g., CD-ROM), floppy or hard disk or other a medium such as firmware or microcode in one or more ROM or RAM or PROM chips, an Application Specific Integrated Circuit (ASIC), etc. The software or firmware or other such configurations can be stored in the controller 140 to cause the controller 140 to perform the techniques explained herein.

Accordingly, one particular embodiment of the present disclosure is directed to a computer program product that includes a non-transitory computer readable medium (e.g., memory, storage repository, optical disk, integrated circuit, etc.). In other words, the controller 140 as discussed herein can include a computer readable medium for storing all or a portion of functionality such as phase control logic 130, control coefficient modifier 132, control signal generator 134, etc. Such algorithms support operations such as power supply switching control functions as discussed herein. For example, in one embodiment, the instructions, when carried out by a controller 140 cause the controller 140 to perform operations as discussed herein.

Figure 2:
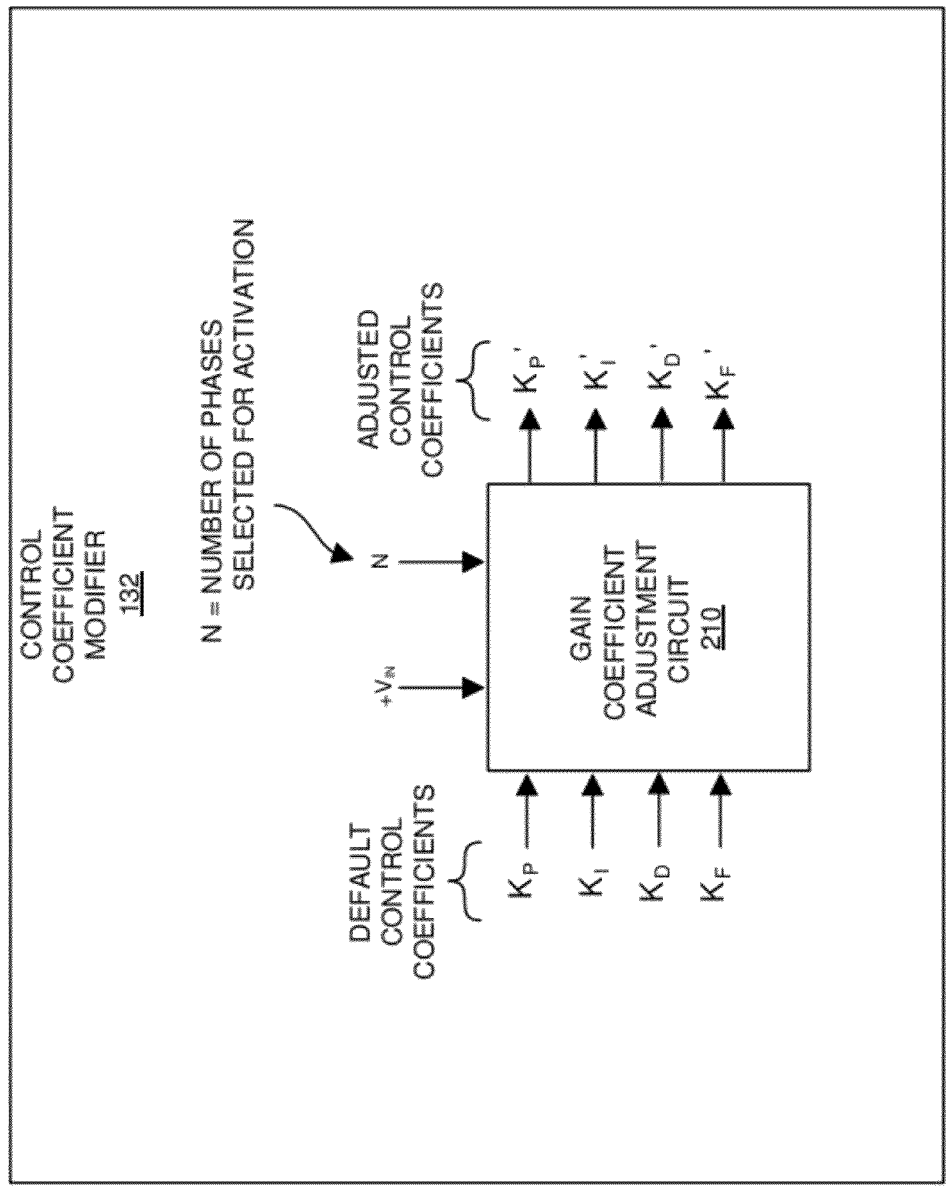
FIG. 2 is an example diagram of a control coefficient modifier according to embodiments herein.

FIG. 2 is an example diagram illustrating control coefficient modifier 132 according to embodiments herein. As shown, the control coefficient modifier 132 receives default values for control coefficients Kp (e.g., a proportional function gain coefficient), Ki (e.g., an integrator function gain coefficient), Kd (e.g., a differential function gain coefficient), and Kf (e.g., a feed forward function gain coefficient).

Control coefficient modifier 132 includes gain adjustment circuit 210. Gain adjustment circuit 210 receives input such as a value indicating a magnitude of the input voltage, Vin.

The gain coefficient adjustment circuit 210 also receives a value, N, indicative of a number of phases to be activated in the power supply 100 to power the load 118. Depending on a magnitude of N and/or Vin, the gain adjustment circuit 210 modifies one or more of the control coefficients Kp, Ki, Kd, and Kf to change operational characteristics of the power supply 100.

For example, the gain adjustment circuit 210 computes a value for Kp' based on Kp and N. The gain adjustment circuit 210 computes a value for Ki' based on Ki and N. The gain adjustment circuit 210 computes a value for Kd' based on Kd and N. The gain adjustment circuit 210 computes a value for Kf based on Kf and N.

As mentioned above, the gain adjustment circuit 210 can be configured to adjust the control coefficients based on Vin as well. In such an embodiment, the gain adjustment circuit 210 computes a value for Kp' based on Kp, Vin, and N. The gain adjustment circuit 210 computes a value for Ki' based on Ki, Vin, and N. The gain adjustment circuit 210 computes a value for Kd' based on Kd, Vin, and N. The gain adjustment circuit 210 computes a value for Kf' based on Kf, Vin, and N.

Note that selection of which coefficients to adjust can vary depending on the application. For example, as discussed below, certain applications can include adjusting coefficients Kp and Kd, while other embodiments can include adjusting Ki and Kd. Specific ways of adjusting the coefficients and filters is discussed in more detail below.

Figure 3:
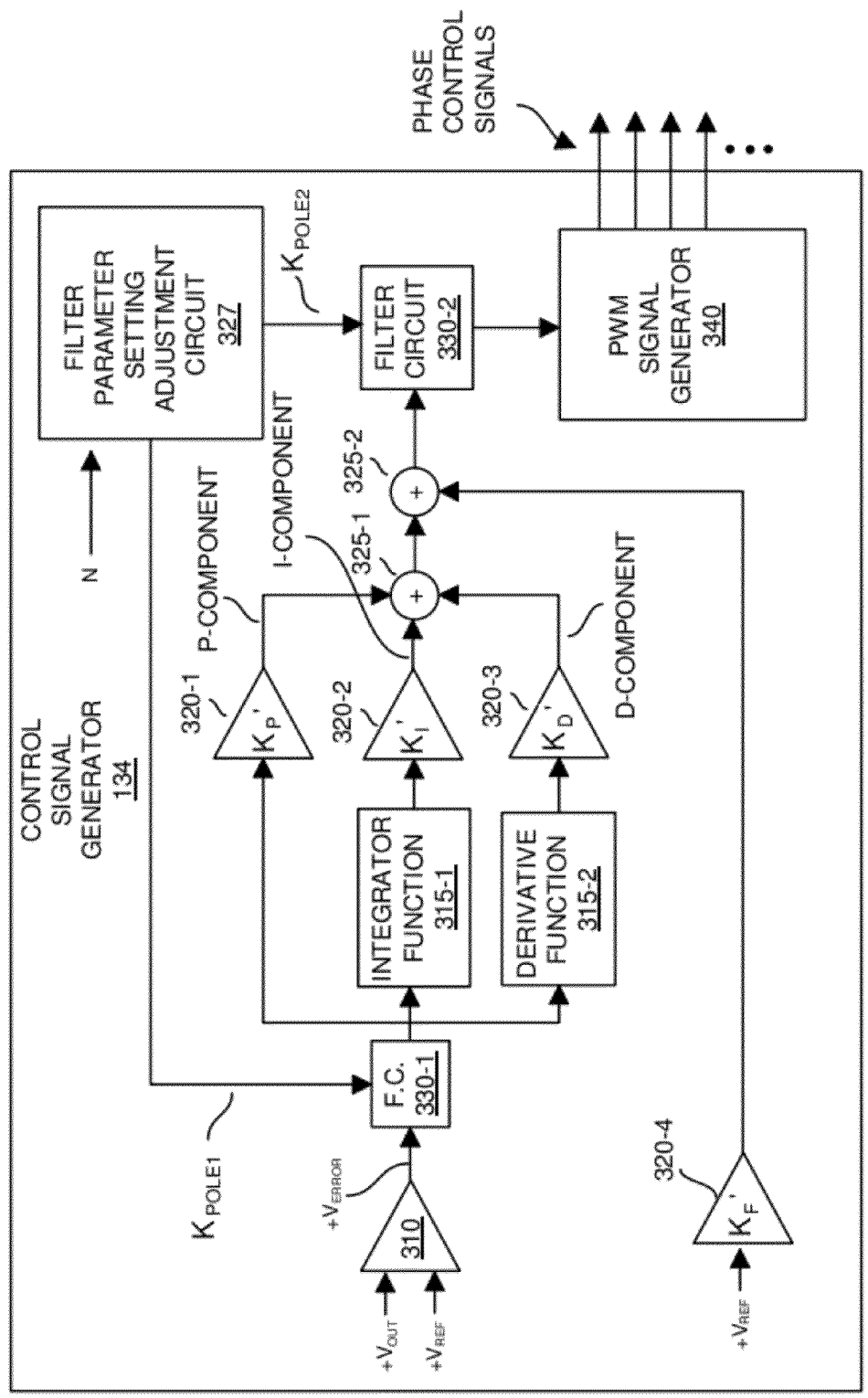
FIG. 3 is an example diagram illustrating a control signal generator according to embodiments herein.

FIG. 3 is an example diagram illustrating control signal generator 134 according to embodiments herein. In one embodiment, the control signal generator 134 includes a PID compensator circuit and feed forward circuit as shown.

For example, difference function 310 of control signal generator 134 receives the output voltage and a reference voltage. Based on a difference between the output voltage and the received reference voltage, the difference function 310 produces an error signal, Verror. The difference function outputs the error signal to filter circuit 330-1. Filter circuit 330-1 outputs a filtered output signal to multiple channels of a PID compensator circuit.

The functions in the PID compensator circuit of control signal generator 134 receive the filtered error voltage produced by the difference function 310 and filter circuit 330-1. For example, gain stage 320-1 receives the filtered error voltage. The integrator function 315-1 receives the filtered error voltage and outputs a respective integrator signal to gain stage 320-2. The derivative function 315-2 (or differential function) receives the filtered error voltage and outputs a respective derivative signal to gain stage 320-3.

Gain stage 320-1 adjusts the magnitude of the filtered error voltage based on a setting of Kp'. Gain stage 320-2 adjusts the magnitude of the integrator signal outputted by integrator function 315-1 based on a setting of Ki'. Gain stage 320-3 adjusts the magnitude of the derivative signal outputted by derivative function 315-2 based on a setting of Kd'.

Gain stage 320-4 adjusts the magnitude of the received voltage reference signal, Vref, based on a setting of Kf.

Control signal generator 134 includes summer 325-1 and summer 325-2 to sum the outputs produced by gain stages 320-1, 320-2, 320-3, and 320-4.

Filter circuit 330-2 receives summation value produced by summer 325-2 as shown.

Control signal generator 134 includes filter parameter setting adjustment circuit 327 to control settings of filter circuit 330-2.

In one embodiment, the filter parameter adjustment circuit 327 receives input such as the value N, (a value indicative of a number of active phases in the power supply 100). Based on such input, the filter parameter adjustment circuit 327 configures or dynamically adjusts one or more parameters such as cutoff frequencies of the filter circuits 330-1 and 330-2 depending on a number of active phases or phases to be activated. Thus, the parameters such as cutoff frequency of the filter circuit 330-1 and cutoff frequency of the filter circuit 330-2 can vary depending on factors such as the number of active phases in the power supply 100.

Pulse width modulation signal generator 340 receives the filtered output produced by filter 330-2. Based on the received filter signal, the pulse width modulation signal generator circuit 340 produces control signals to control the active phases in the power supply 100. As previously discussed, a different number of phases are activated depending on the load 118.

In one embodiment, the open loop converter transfer function of the active phases is proportional to input voltage. For example, in such an embodiment, the controller 140 digitizes the received input voltage via an Analog-to-Digital converter. The controller can be configured to filter the digitized input voltage produced by the analog to digital converter.

In one embodiment, the control coefficient modifier 132 as discussed above in FIG. 2 adjusts or scales the P, I, D and F coefficients by dividing P, I, D and F coefficients by the digitized input voltage to maintain the same closed loop bandwidth over a range of different values for Vin.

In one embodiment, a magnitude of the input voltage, Vin, can vary in a range from less than 3 volts to more than 20 volts although Vin may be any suitable magnitude. The control coefficients can be adjusted to account for this variation in magnitude.

As an example, the control coefficient modifier 132 can scale the coefficients as follows:

$P(Vin) = P/Vin$ $I(Vin) = I/Vin$ $D(Vin) = D/Vin$ $F(Vin) = F/Vin$

As previously discussed, if the output current consumed by the load 118 is relatively small, the controller 132 operates power supply 100 with a single active phase. This reduces switching losses and improves efficiency. As the output current consumed by the load 118 increases, the power supply voltage regulator adds phases to produce additional current for powering the load 118. Changing the number of phases leads to a change in the effective inductance, Leff, of the power supply 100.

Because the inductor of each phase are configured in parallel to each other for active phases, Leff=L/n, where n is the number of phases.

Since the resonant frequency=1/(2*pi*sqrt(Leff*C)), the resonant frequency of the power supply 100 scales with the square root of the number of phases.

The open loop gain of the power supply 100 scales directly with the number of active phases.

The ripple frequency=fsw*N, where fsw is the switching frequency of the high side switch and low side switches in the power supply 100. Thus, the ripple frequency scales with the number of active phases.

In one embodiment, all coefficient scaling performed by the control coefficient modifier 132 is done digitally. In such an embodiment, there is no need to physically change or electrically switch any physical components or networks of the power supply 100 to modify the controller 140 and its behavior.

Most conventional voltage regulator chips in the market today operate based upon analog control techniques. Such conventional circuits rely on a setting of a physical compensation network for their control function. These components cannot be scaled in response to changing input voltage or changing number of phases.

In addition to adjusting one or more control coefficients as discussed above, embodiments herein can include further adjusting the control coefficients in accordance with the methods as discussed below in FIGS. 4 and 7. Both methods maintain stability over a range of active phases.

Figure 4:
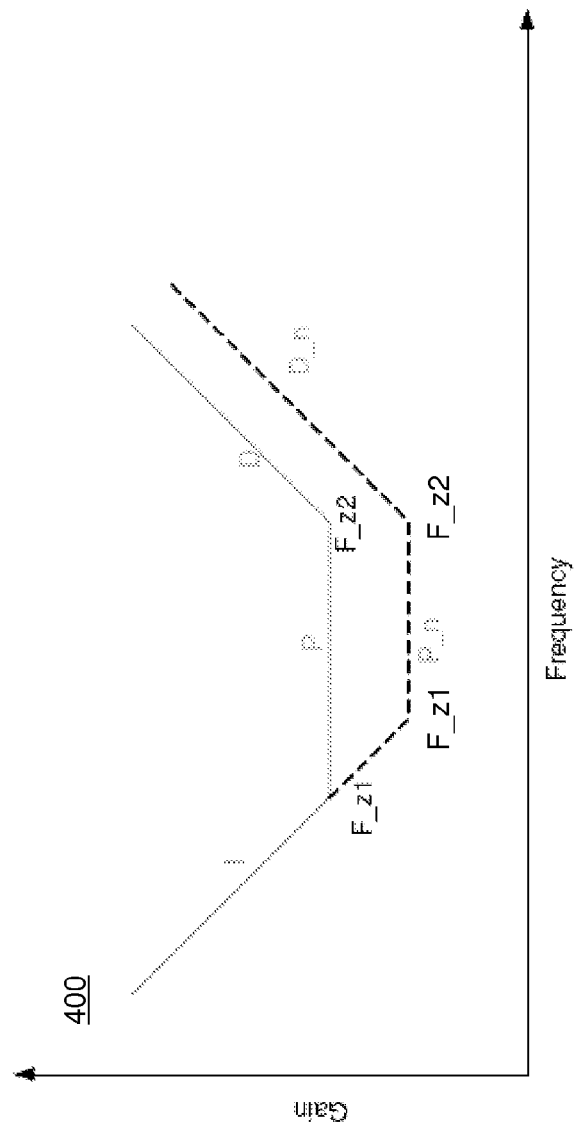
FIG. 4 is an example diagram illustrating a theoretical transfer function associated with a PID compensator circuit in a first mode according to embodiments herein.

Now, more specifically, FIG. 4 is an example theoretical graph 400 illustrating open loop gain associated with the power supply 100 when operating in a first mode according to embodiments herein.

Operating in the first mode can include: i) adjusting the control coefficients (e.g., Kp, Ki, Kd, and Kf) via control coefficient modifier 132 and ii) adjusting a cutoff frequency of filters 330 (e.g., filter 330-1 and filter circuit 330-2) via filter parameter adjustment circuit 327 as follows:

$Kp' = Kp/n,$ $Ki' = Ki,$ $Kd' = Kd/n,$

Kpole1(n)=Kpole1*n. Note that Kpole1 is a filter pole to filter the error voltage signal, Kpole2(n)=Kpole2*n. Note that Kpole2 is a filter pole to attenuate the ripple voltage, where n=number of active phases.

As discussed above, note that the setting of the gain values also can be proportionally adjusted based on a magnitude of the input voltage, Vin.

Graph 400 illustrates how scaling of the coefficients affects the compensator transfer function when a different number of phases are active producing the output voltage.

For example, to account for an increase in an open loop gain of the power supply 100 when more phases are active, embodiments herein include scaling default value Kp down by the number of active phases, n, to produce the gain coefficient Kp'. Additionally, as indicated above, the control coefficient modifier 132 scales down coefficient Kd to produce coefficient Kd' for an increasing number of active phases.

As shown in graph 400, the frequency of zero F_z1 increases as the number of active phase increases, while preserving the frequency of zero F_z2 even though the number of active phases increases.

Thus, while in this first mode, the open loop gain of the power supply 100 can be roughly the same irrespective of the number of active phases. FIG. 4 also illustrates scaling coefficient D down to ensure that F_z2, the zero formed by P and D, does not move in frequency when different number of phases are activated.

Figure 5:
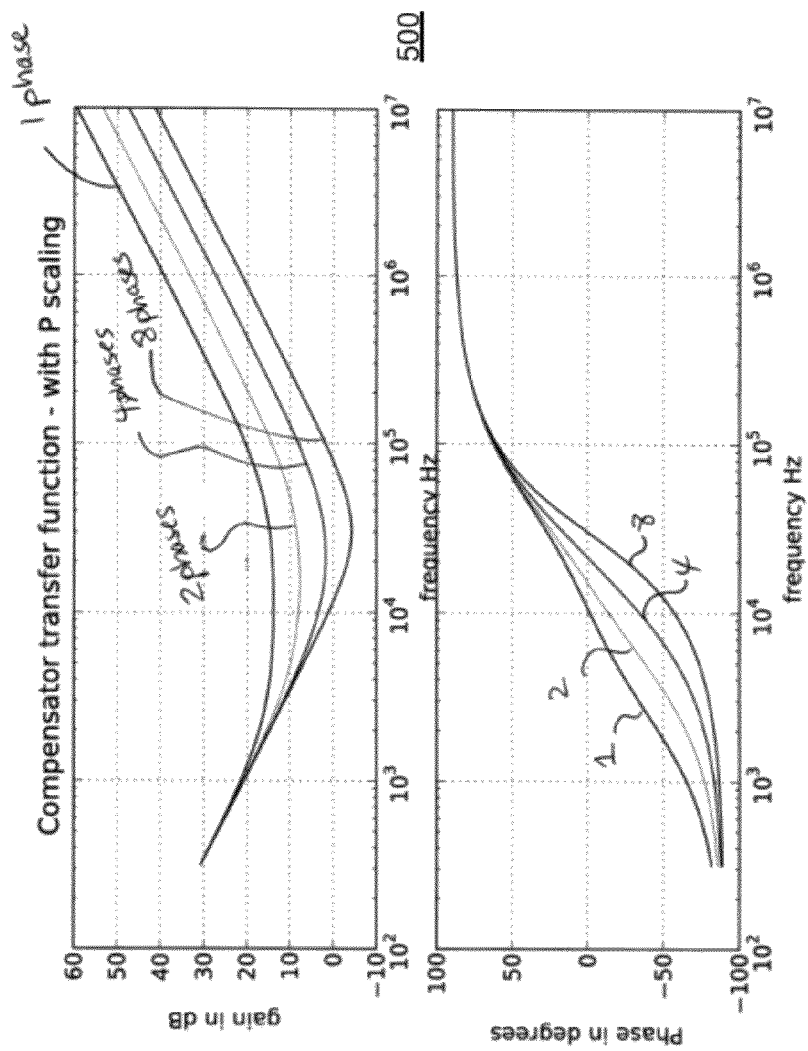
FIG. 5 is an example diagram illustrating a theoretical PID compensator circuit transfer function in the first mode according to embodiments herein.

FIG. 5 is an example theoretical graph 500 illustrating variation of a PID compensator circuit transfer function while the controller 140 is in the first mode (as discussed in FIG. 4) according to embodiments herein.

As previously discussed, and as shown in graph 500, via adjusting control coefficients Kp and Kd, the controller 140 adjusts a PID compensator transfer function depending on whether 1, 2, 4, 8, etc., phases are activated in the power supply 100.

Figure 6:
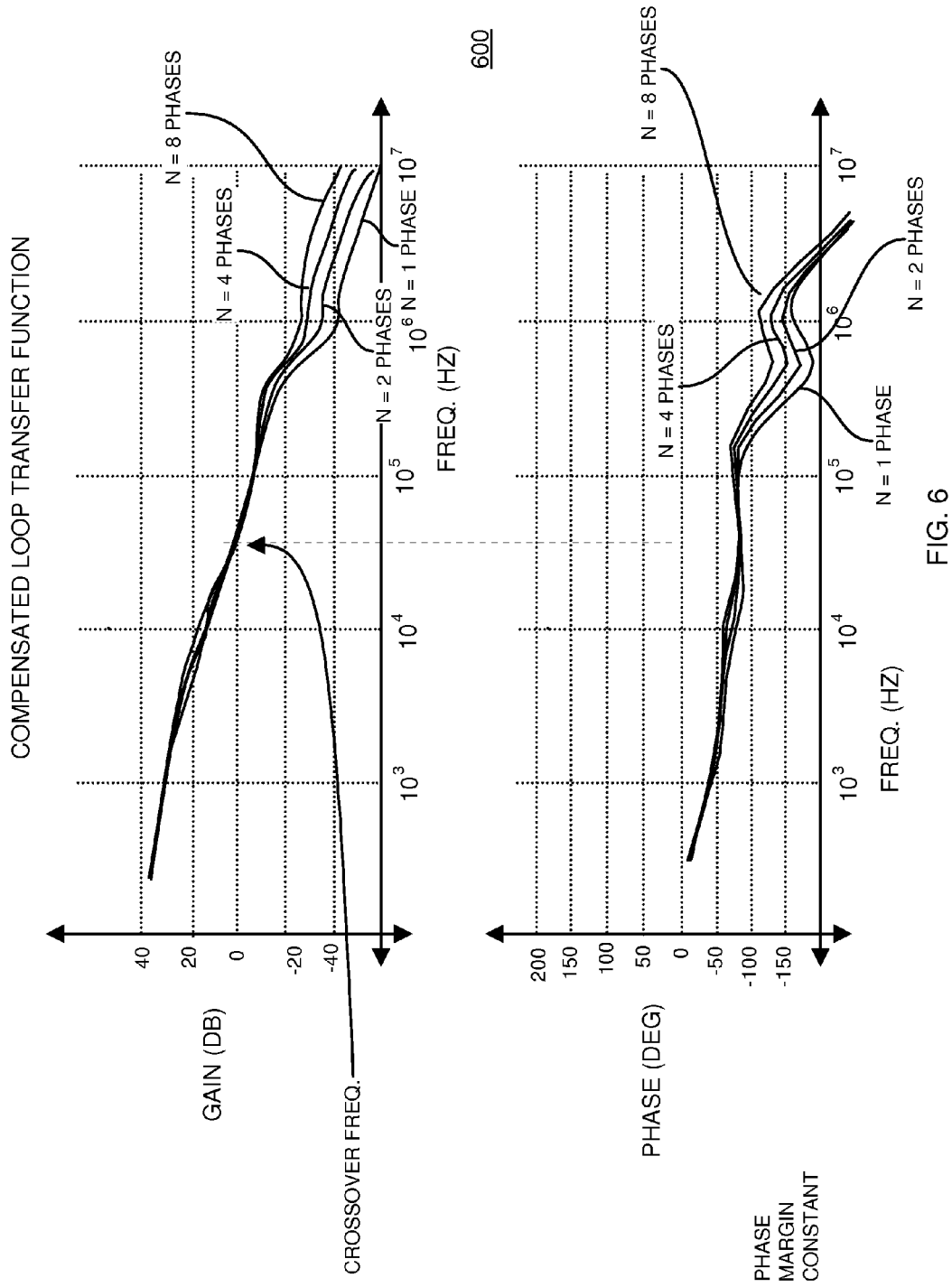
FIG. 6 is an example diagram illustrating a theoretical compensated loop transfer function associated with the first mode according to embodiments herein.

FIG. 6 is an example theoretical graph illustrating a compensated loop transfer function of power supply 100 for the first mode (as discussed in FIG. 4) according to embodiments herein.

As shown, the crossover frequency (in which the gain is zero dB) is approximately the same for the power supply 100 regardless of the number of activated phases. The phase margin of the open loop transfer function in graph 600 is approximately constant (e.g., 80 degrees) regardless of the number of active phases. Accordingly, embodiments herein include adjusting a magnitude of at least one gain coefficient in the power supply 100 based on the value, n, so that the crossover frequency of the power supply is substantially fixed regardless of the number of phases that are activated to produce the output voltage 190.

The phase margin is greater than 45 degrees regardless of the number of active phases. The gain margin is also greater than 10 dB regardless of the number of active phases. Accordingly, the power supply 100 is operationally stable in the first mode over a range of different activated phases.

Figure 7:
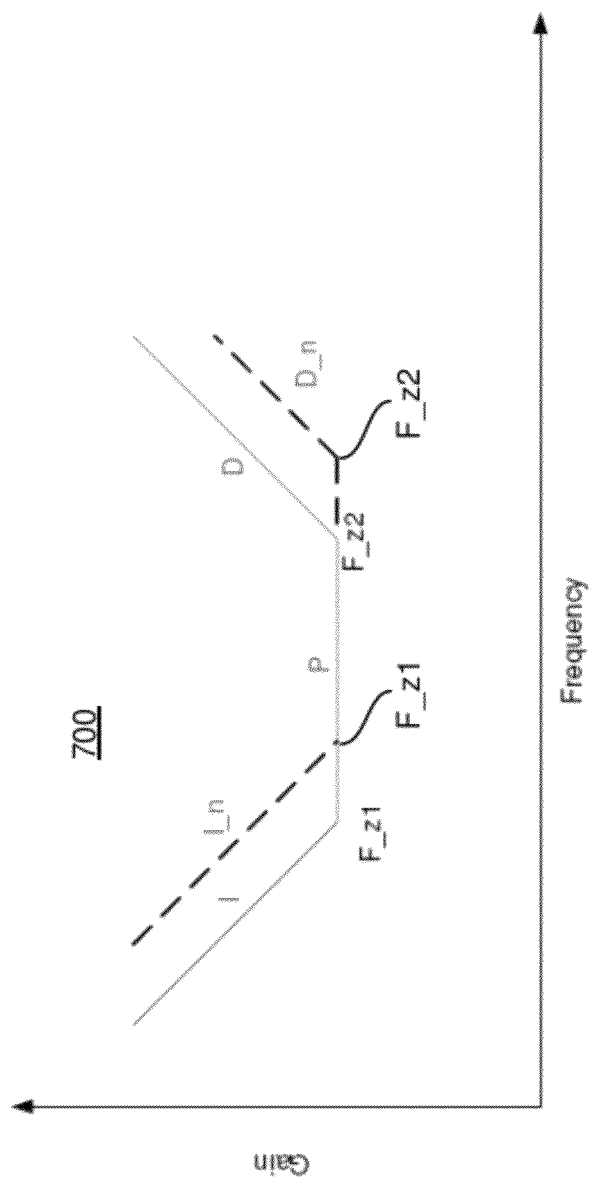
FIG. 7 is an example diagram illustrating a theoretical transfer function associated with a PID compensator circuit in a second mode according to embodiments herein.

FIG. 7 is an example theoretical graph 700 illustrating an compensator transfer function associated with the active phases in power supply 100 when operating in a second mode according to embodiments herein.

In accordance with one embodiment, operating in the second mode includes: i) adjusting the control coefficients (e.g., Kp, Ki, Kd, and Kf) via control coefficient modifier 132 and ii) adjusting a cutoff frequency of filter 330-2 via filter parameter adjustment circuit 327 as follows:

$Kp'=Kp,$ $Ki'=Ki*n^x,$ where $x=0.5$ to 1

$Kd'=Kd/n^x,$ where $x=0.5$ to 1,

Kpole1(n)=Kpole1*$n^x$. Note that Kpole1 is a filter pole to filter the error voltage signal, Kpole2(n)=Kpole2*$n^x$. Note that Kpole2 is a filter pole to attenuate the ripple voltage, where n=number of active phases, where x is a user programmable value.

As discussed above, note that the setting of the gain values or control coefficients also can be proportionally adjusted based on a magnitude of the input voltage, Vin.

Graph 700 illustrates how scaling of the coefficients in the second mode affects the open loop transfer function of a PID compensator circuit when a different number of phases are activated to produce the output voltage 190.

For example, in this second mode, the control coefficient modifier 132 does not adjust the Kp coefficient even though the open loop gain increases as the number of active phases increases. However, the control coefficient modifier 132 does adjust coefficients Ki and Kd depending on an active number of phases.

As shown, the result of modifying the coefficients Ki and Kd into Ki' and Kd' shifts the frequency of F_z1 and F_z2 upwards as the number active phases increases. Accordingly, embodiments herein include modifying an open loop gain associated with the power supply 100 by adjusting the magnitude of the at least one control coefficient depending on the number of phases that are activated to produce the output voltage 190.

While in this second mode, the controller 140 preserves coefficient Kp and scales coefficients Ki and Kd to make zeros F_z1 and F_z2 track the double pole (resonant frequency) as the number of active phases change.

Figure 8:
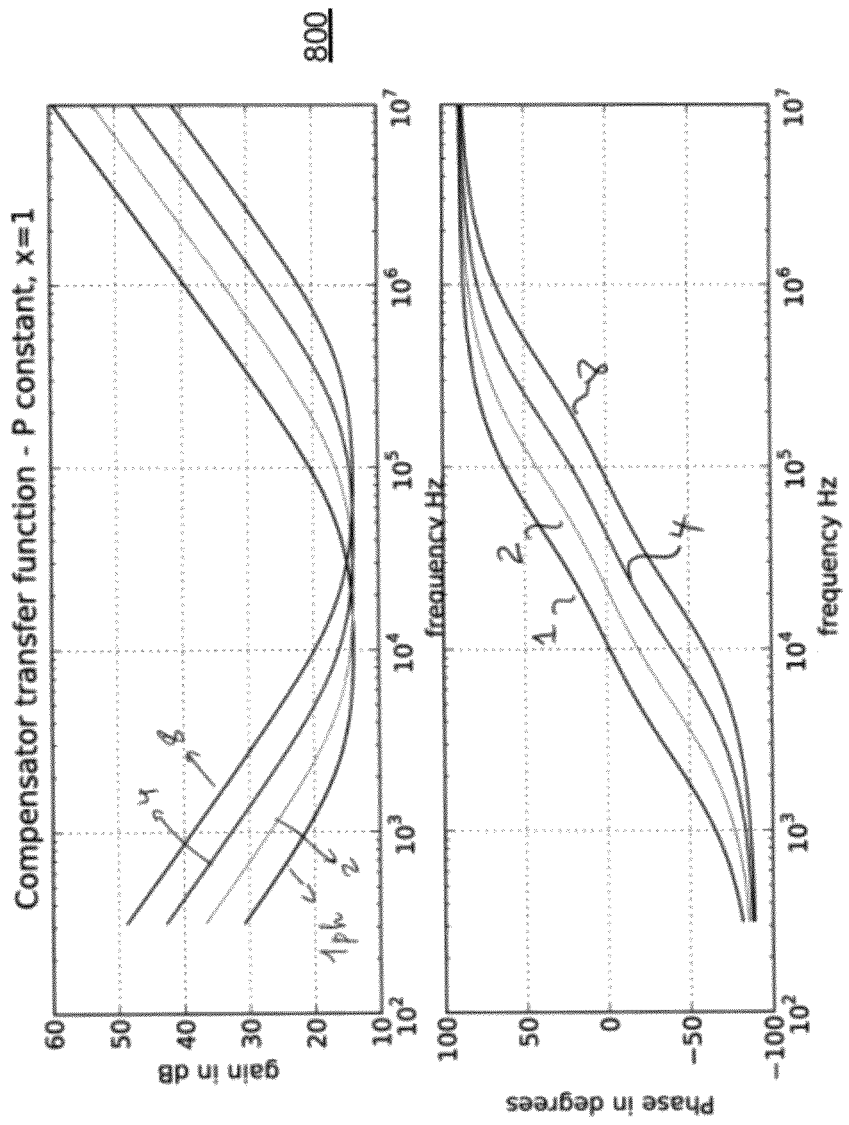
FIG. 8 is an example diagram illustrating a theoretical PID compensator circuit transfer function in the second mode according to embodiments herein.

FIG. 8 is an example theoretical graph 800 illustrating variation of a PID compensator circuit transfer function while the controller 140 is in the second mode (as discussed above in FIG. 7) according to embodiments herein.

As previously discussed, and as shown in graph 800, via adjusting control coefficients Ki and Kd in the PID compensator circuit, the controller 140 adjusts a compensator transfer function depending on whether 1, 2, 4, 8, etc., phases are activated. As previously discussed, the transfer function shifts to the right as the number of active phases increases and shifts to the left as the number of active phases decreases.

Figure 9:
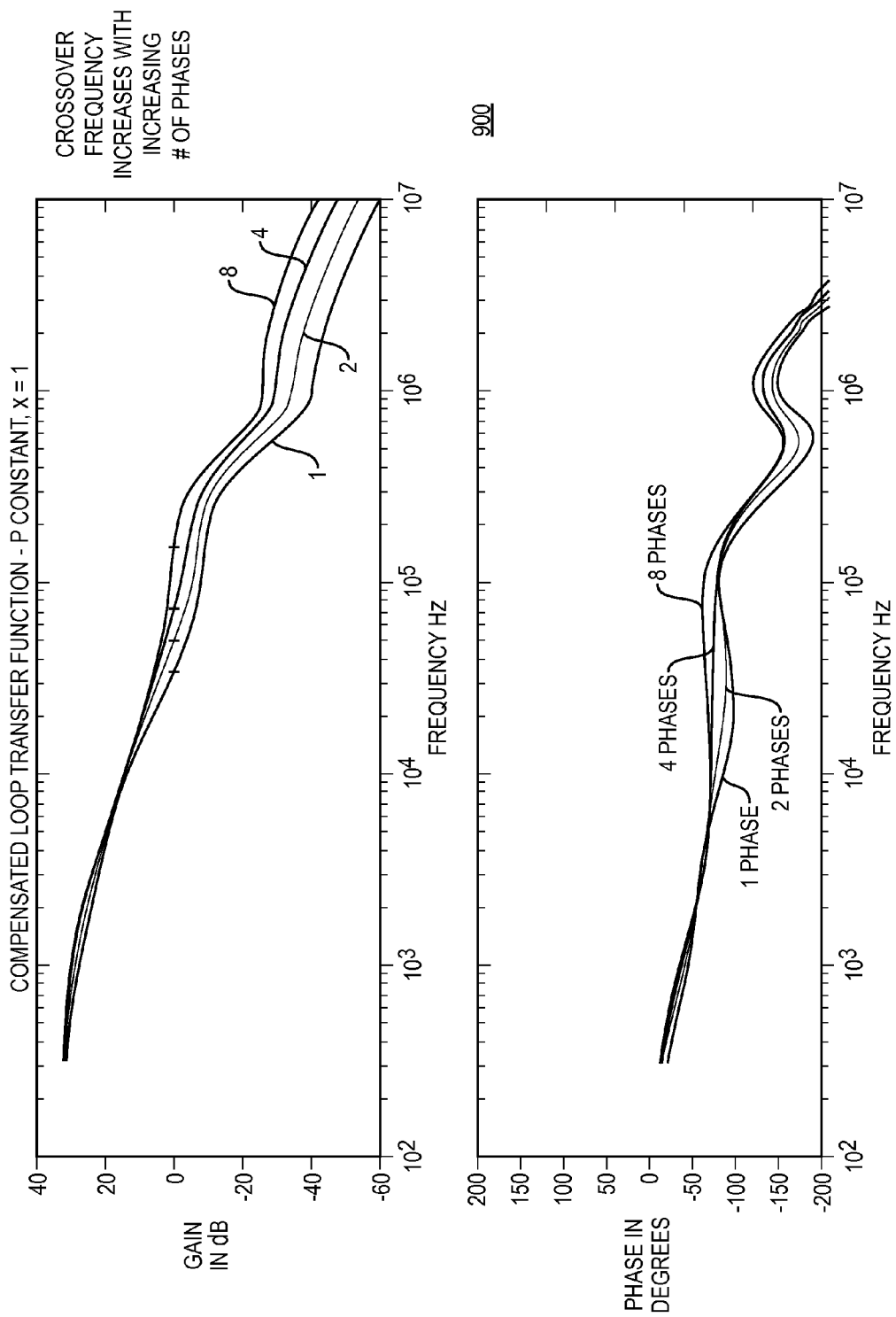
FIG. 9 is an example diagram illustrating a theoretical compensated loop transfer function associated with the second mode according to embodiments herein.

FIG. 9 is an example theoretical graph 900 illustrating a compensated loop transfer function of power supply 100 according to embodiments herein.

As shown, the crossover frequency (in which the gain is zero dB) increases as the number of active phases increases. Accordingly, embodiments herein include adjusting a magnitude of at least one gain coefficient in the power supply 100 based on the value, n, so that the crossover frequency of the power supply increases for an increased number of phases that are activated to produce the output voltage 190.

The corresponding open loop gain of the power supply 100 increases as the number of active phases increases, rendering the power supply 100 more responsive to power load 118.

As shown, the corresponding phase margins of the compensated loop transfer function fall in a range between approximately 130 and 80 degrees. Thus, the phase margin is greater than 45 degrees regardless of the number of active phases. The gain margin is also greater than 10 dB regardless of the number of active phases. Accordingly, the power supply is operationally stable in the second mode over a range of different activated phases.

Figure 10:
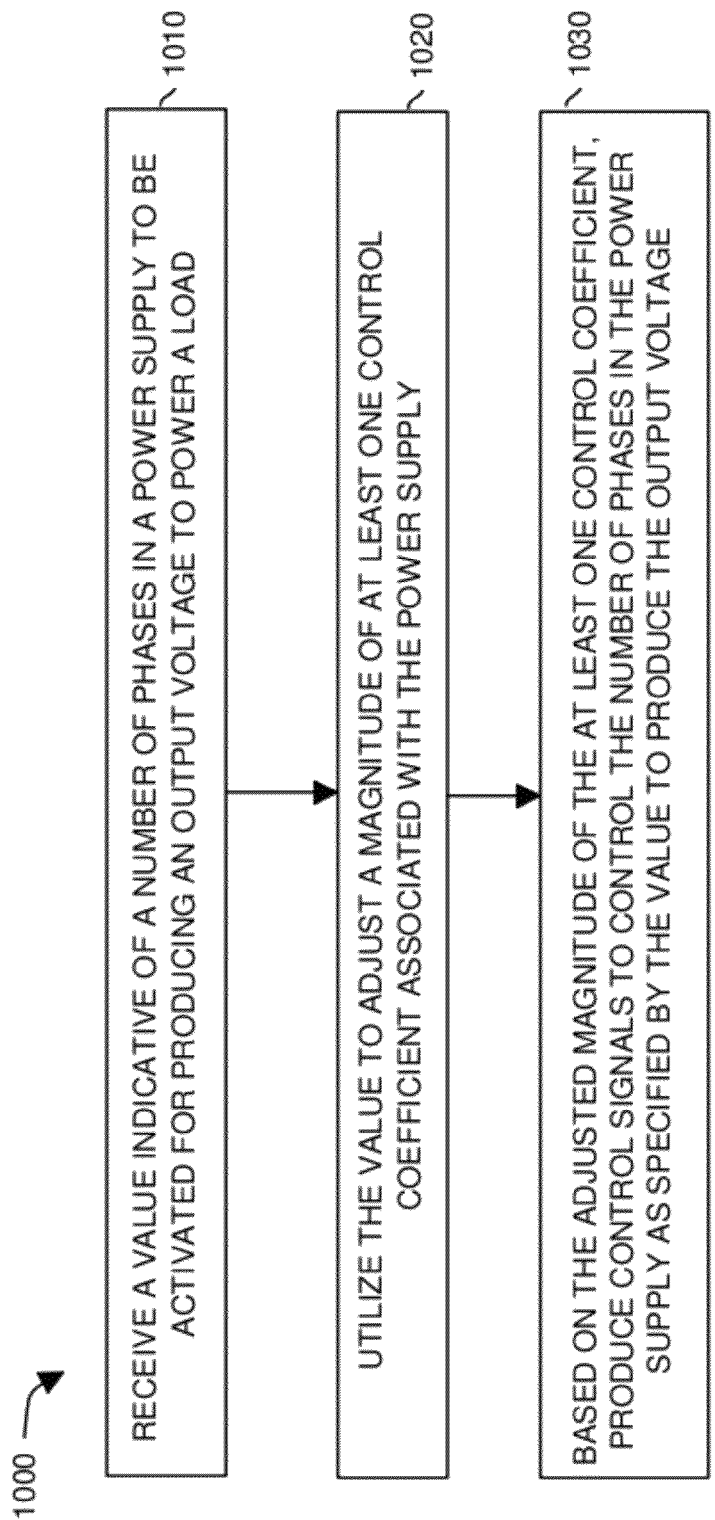
FIGS. 10-12 are flowcharts illustrating example methods according to embodiments herein.

FIG. 10 is a flowchart 1000 illustrating an example method of controlling operation of a power supply 100 according to embodiments herein. Note that there will be some overlap with respect to concepts as discussed above. Also, the steps can be executed in any suitable order.

In step 1010, the control coefficient modifier 132 of controller 140 receives a value indicative of a number of phases in power supply 100 to be activated for producing output voltage 190 to power a load 118.

In step 1020, the control coefficient modifier utilizes the value received from the control coefficient modifier 132 to adjust a magnitude of at least one control coefficient associated with the power supply 100.

In step 1030, based on the adjusted magnitude of the at least one control coefficient, the control signal generator 134 produces control signals to control the number of phases in the power supply 100 as specified by the value to produce the output voltage 190.

Figure 11:
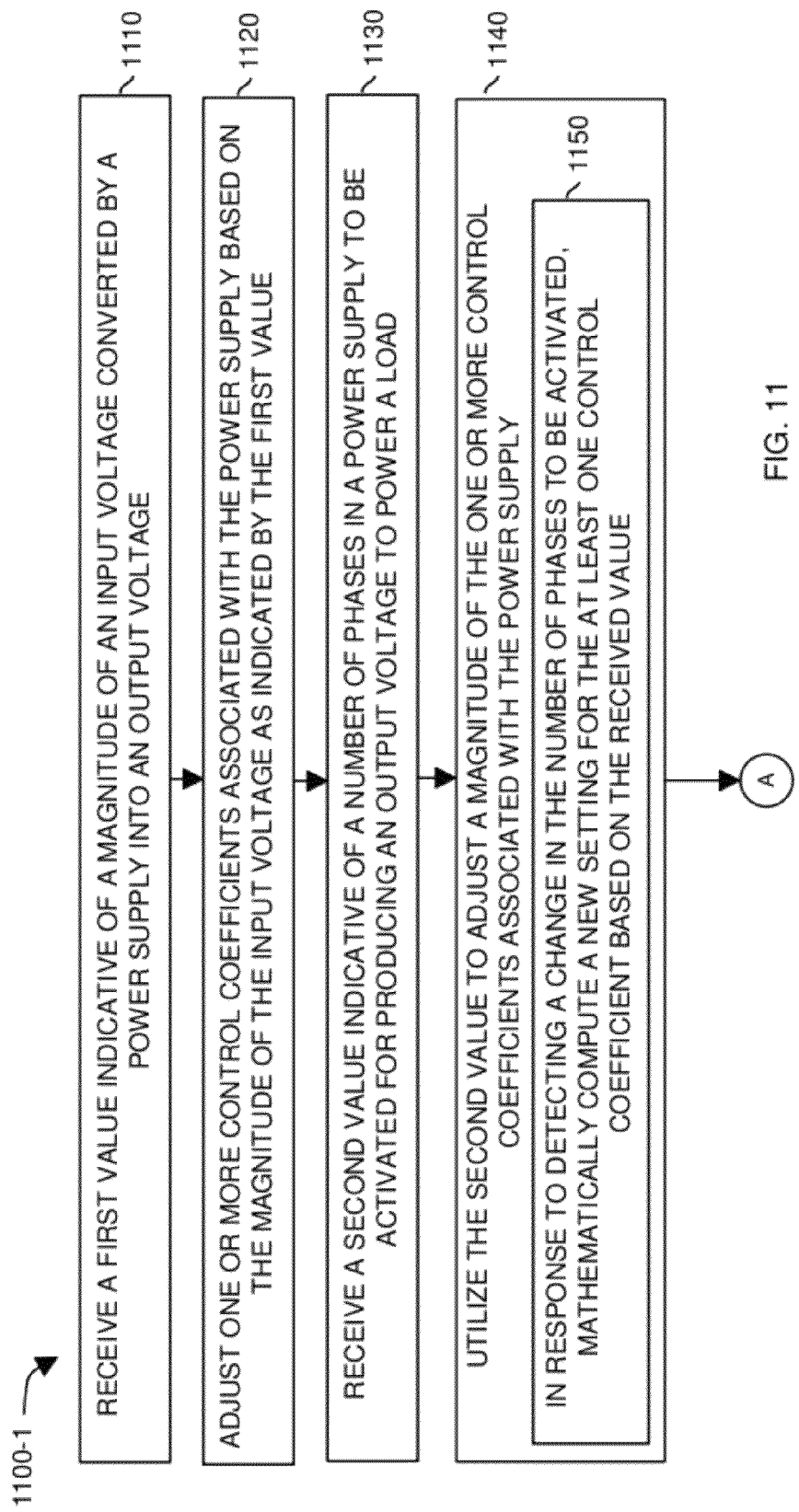
Figure 12:
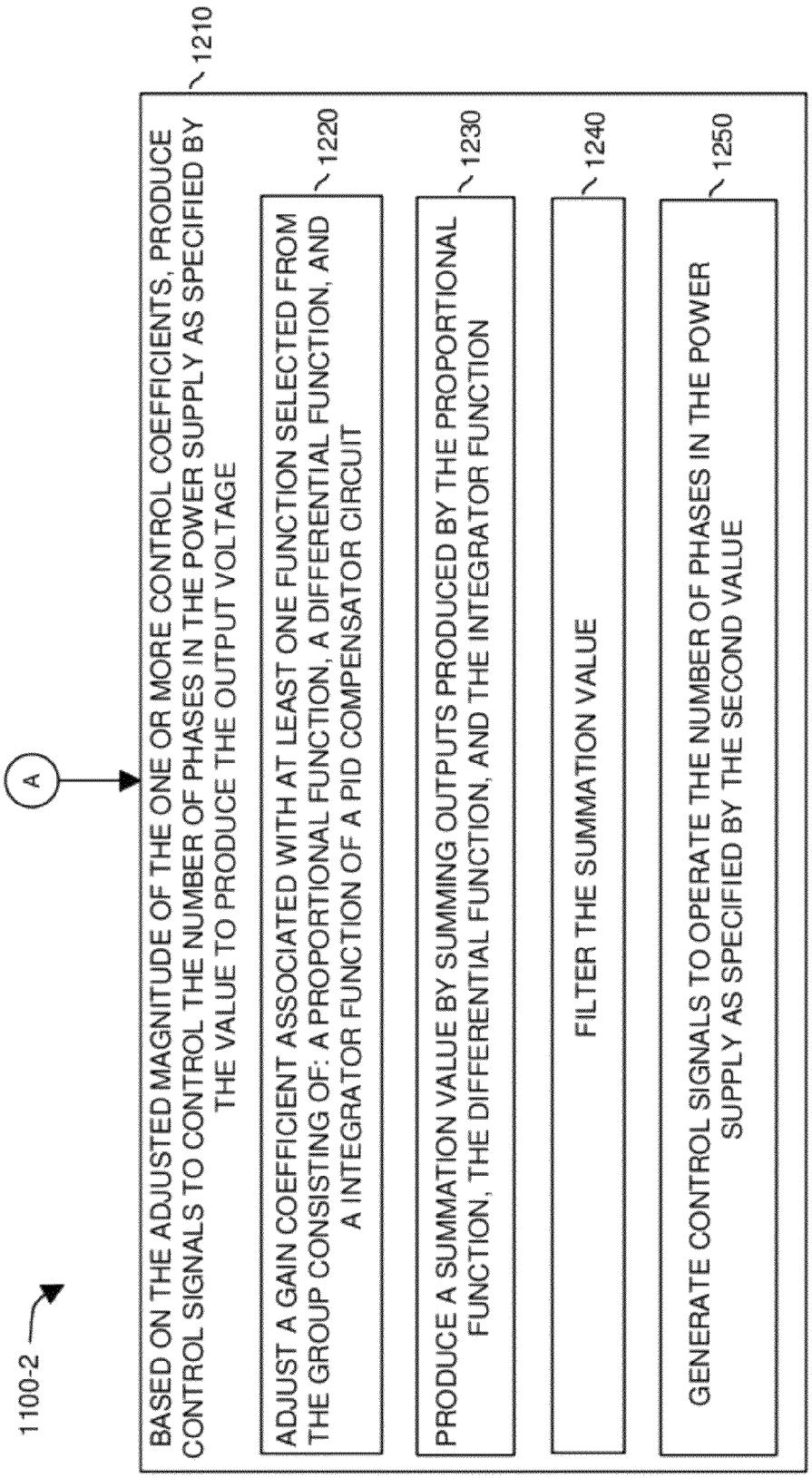

FIGS. 11 and 12 combine to form flowchart 1100 (e.g., flowchart 1100-1 and flowchart 1100-2) illustrating a detailed example method of operating a power supply according to embodiments herein. Note that there will be some overlap with respect to concepts as discussed above. The steps below can be executed in any suitable order.

In step 1110 in flowchart 1100-1, the control coefficient modifier 132 receives a first value, such as a digital representation of Vin, indicative of a magnitude of the input voltage 120 converted by power supply 100 into output voltage 190.

In step 1120, the control coefficient modifier 132 adjusts one or more control coefficients associated with the power supply 100 based on the magnitude of the input voltage 120 as indicated by the first value.

In step 1130, the controller 140 receives a second value (e.g., N) indicative of a number of phases in power supply 100 to be activated for producing output voltage 190 to power load 118.

In step 1140 in flowchart 1100-1, the control coefficient modifier 132 of controller 140 utilizes the first value and/or second value to adjust a magnitude of the one or more control coefficients associated with the power supply 100.

In step 1150, in one embodiment, in response to detecting a change in the number of phases to be activated, the controller 140 mathematically computes a new setting for the at least one control coefficient based on the received value. In other words, as an example, if the control detects that N (a number of activated phases or phases to be activated) changes from operating 8 phases down to 5 phases, or detecting that N changes from 1 to 2, the control coefficient modifier 132 modifies a magnitude of the gain coefficients.

In one embodiment, computing the new setting can include proportionally reducing the magnitude of the at least one control coefficient by an amount as specified by the value, such as N.

In step 1210 of flowchart 1100-2, based on the adjusted magnitude of the one or more control coefficients, the control signal generator 134 of controller 140 produces control signals to control switches in the number of active phases as specified by the value, N, to produce the output voltage 190.

In sub-step 1220, the control coefficient modifier 132 adjusts a gain coefficient associated with at least one function selected from the group consisting of: a proportional function, a differential function, and a integrator function of a PID compensator circuit.

In sub-step 1230, the control signal generator 134 produces a summation value by summing outputs produced by the proportional function, the differential function, and the integrator function. In one embodiment, the control signal generator 134 modifies a cutoff frequency of filter circuit 330-1 based at least in part on the value, N. As previously discussed, the control signal generator 134 utilizes the filter circuit 330-1 to filter the error voltage inputted to the PID compensator.

In sub-step 1240, the control signal generator 134 filters the summation value via filter circuit 330-2. As previously discussed, the control signal generator 134 modifies a cutoff frequency of filter circuit 330-2 based on the value, N, and utilizes the filter circuit 330-2 to filter an output of the PID compensator, the filtered output of the PID compensator being used at least in part to produce the phase control signals.

In sub-step 1250, the control signal generator 134 generates control signals to operate the number of phases in the power supply as specified by the value, N.

FIGS. 13-19 are directed to a common embodiment in which one or more configuration settings (e.g., one or more PID coefficients and/or one or more filter circuits, etc.) of a power supply control circuitry are adjusted such that the configuration settings proportionally track changes in a resonant frequency of power supply 100 according to embodiments herein.

For example, the resonant frequency of the power supply changes by a factor, $\sqrt{n}$, where n=the number of activated phases. As discussed below, certain control parameters of the power supply can be adjusted based on the adjustment factor, $\sqrt{n}$, to provide increased responsiveness.

Figure 13:
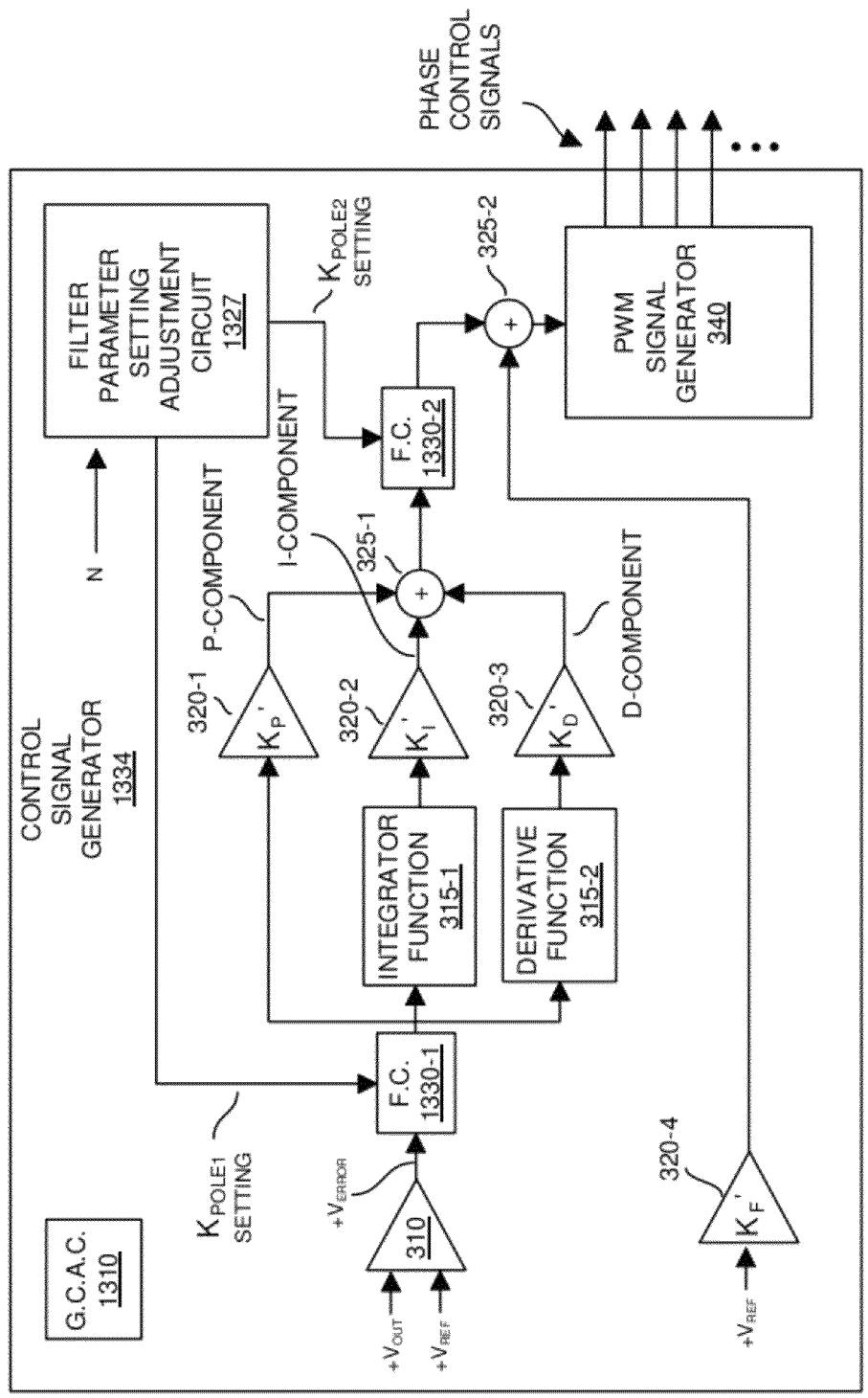
FIG. 13 is an example diagram illustrating a control signal generator according to embodiments herein.

More specifically, FIG. 13 is an example diagram illustrating control signal generator 1334 according to embodiments herein. As shown, the control signal generator 1334 includes a configuration of a PID compensator circuit and feed forward circuit to provide control functionality as shown.

During operation, difference function 310 of control signal generator 1334 receives the output voltage, $V_{out}$ (recall that $V_{out}$ powers load 118), and a reference voltage, $V_{ref}$ (i.e., a setpoint). Based on a difference between the output voltage and the received reference voltage, the difference function 310 produces an error signal, Verror. The difference function 310 outputs the error signal through filter circuit 1330-1 to multiple channels of a PID compensator circuit. Filter parameter setting adjustment circuit 1327 controls settings of filter circuit 1330-1 and filter circuit 1330-2.

In one embodiment, the filter parameter setting adjustment circuit 1327 proportionally modifies a setting of the cutoff frequency (and/or zeros) of the filter circuit 1330-1 based at least in part on a setting of the resonant frequency of the power supply for the number of phases (n) to be activated. The control signal generator 1334 utilizes the filter circuit 1330-1 to filter the error voltage, Verror, inputted to the following circuit stage (e.g., a PID compensator) in the power supply 100.

As shown, the functions in the PID compensator circuit of control signal generator 1334 receive the filtered error voltage produced by filter circuit 1330-1. For example, gain stage 320-1 receives the filtered error voltage produced by filter circuit 1330-1. The integrator function 315-1 receives the filtered error voltage from filter circuit 1330-1 and outputs a respective integrator signal to gain stage 320-2. The derivative function 315-2 (or differential function) receives the filtered error voltage and outputs a respective derivative signal to gain stage 320-3.

Gain stage 320-1 (set to a gain of Kp') adjusts the magnitude of the filtered error voltage based on a gain setting of Kp'. Gain stage 320-2 scales the magnitude of the integrator signal outputted by integrator function 315-1 based on a gain setting of Ki'. Gain stage 320-3 adjusts the magnitude of the derivative signal outputted by derivative function 315-2 based on a gain setting of Kd'.

Gain stage 320-4 adjusts the magnitude of the received voltage reference signal, Vref, based on a setting of Kf'.

Control signal generator 1334 includes summer 325-1 to sum the outputs (e.g., P-component, I-component, and D-component) produced by respective gain stages 320-1, 320-2, and 320-3.

Filter circuit 1330-2 receives summation value produced by summer 325-1 as shown.

Control signal generator 1334 further includes summer 325-2 to sum the output produced by filter circuit 1330-2 and the output (e.g., $K_f' \cdot V_{ref}$) produced by stage 320-4.

As mentioned, control signal generator 1334 includes filter parameter setting adjustment circuit 327 to control settings of the filter circuits 1330 (e.g., filter circuit 1330-1 and filter circuit 1330-2).

In one embodiment, the filter parameter adjustment circuit 1327 receives input such as the value N (i.e., a value indicative of a number of active phases in the power supply 100). Based on such input, as further discussed below, the filter parameter adjustment circuit 1327 configures one or more parameters such as a cutoff frequency of the filter circuit 1330-1 and/or filter circuit 1330-2. Control parameters such as cutoff frequencies, zeros, etc. of the filter circuits 1330 can vary depending on factors such as the number of active phases in the power supply 100.

Pulse width modulation signal generator 340 in control signal generator 1334 receives the filtered output produced by summer 325-2. Based on this received signal, the pulse width modulation signal generator circuit 340 produces control signals to control the active phases in the power supply 100. As previously discussed, a different number of phases, N, can be activated depending on an amount of power consumed by the load 118. The settings of the power supply control circuitry are adjusted depending on the number of phases to be activated.

In one embodiment, the open loop converter transfer function of the active phases is proportional to input voltage, Vin. For example, in such an embodiment, the controller 140 digitizes the received input voltage (as received from voltage source 120) via an analog-to-digital converter. The controller can be configured to filter the digitized input voltage produced by the analog to digital converter.

In accordance with further embodiments, the control coefficient modifier 132 as discussed above in FIG. 2 adjusts or scales the P, I, D and F coefficients by dividing P, I, D and F coefficients by the digitized input voltage to maintain the same closed loop bandwidth over a range of different values for Vin. Accordingly, parameters of the power supply control circuitry can be adjusted depending on a magnitude of Vin. In one embodiment, a magnitude of the input voltage, Vin, can vary in a range from less than 3 volts to more than 20 volts. The control coefficients can be adjusted to account for this variation in magnitude.

As an example, the control coefficient modifier 132 (or, more specifically, the gain coefficient adjustment circuit 210) can be configured to scale the default coefficients Kp, Ki, Kd, and Kf as follows:

$$K_P'=K_P/Vin$$

$$K_I'=K_I/Vin$$

$$K_D'=K_D/Vin$$

$$K_F'=K_F/Vin$$

As previously discussed, if the output current consumed by the load 118 is relatively small, the controller 132 operates power supply 100 with a single active phase (e.g., n=1). This reduces switching losses and improves efficiency. As the output current consumed by the load 118 increases, the power supply voltage regulator adds phases to produce additional current for powering the load 118.

Changing the number of activated phases causes a change in the effective inductance, Leff, of the power supply circuit and therefore resonant frequency of the power supply 100. Because the inductor of each phase are configured in parallel to each other for active phases, Leff=L/n, where n is the number of active phases. Each phase can include an inductor having a substantially same value (e.g., value L). The inductors can be also be of differing values.

Since the resonant frequency of the power supply=1/(2*pi*sqrt(Leff*$C_o$)), where $C_o$=the amount of total output capacitance of the bank $C_o$ in FIG. 1, the resonant frequency of the power supply 100 scales with the inverse square root of the number of phases. That is, the resonant frequency of the power supply changes depending on the number of activated phases. As mentioned, assuming the inductor in each phase is equal to L, the resonant frequency of the power supply 1/(2*pi*sqrt(nL*$C_o$)).

Thus, the resonant frequency of the power supply is equal to 1/(2*pi*sqrt(L*$C_o$)) when a single phase is activated; the resonant frequency of the power supply is equal to 1/(2*pi*sqrt(2L*$C_o$)) when 2 phases are activated; the resonant frequency of the power supply is equal to 1/(2*pi*sqrt(4L*$C_o$)) when a four phases are activated; and so on. The variation in the resonant frequency amongst the different phase activation settings is thus $1/\sqrt{n}$. Thus, by way of a non-limiting example, the resonant frequency of the power supply varies depending on an inductance and output capacitance of the power supply 100. The inductance varies depending on a number of phases activated; the output capacitance can be a substantially fixed regardless of the number of phases that are activated.

At least a portion of the open loop gain of the power supply 100 scales directly with the number of active phases. For example, as discussed below, via control coefficient modifier 132, Kp' can be set to Kp/$\sqrt{n}$, Kpole1(n) can be set to Kpole1*$\sqrt{n}$, and Kpole2(n)=Kpole2*$\sqrt{n}$, where Kpole1 and Kpole2 are default values for s single activated phase. Accordingly, the settings of the power supply circuitry can be adjusted to account for the change in resonant frequency of the power supply when more or less phases are activated.

The ripple frequency=fsw*N, where fsw is the switching frequency of the high side switch and low side switches in the power supply 100. Thus, the ripple frequency scales with the number of active phases.

In one embodiment, the coefficient scaling and/or pole/zero scaling is performed by the control coefficient modifier 132 and filter parameter setting adjustment circuit 1327. Such resources (e.g., control coefficient modifier 132 and the filter parameter setting adjustment circuit 1327) digitally control the power supply control circuitry settings. In such an embodiment, using digit scaling of control parameters, there is no need to physically change or electrically switch any physical components or networks of the power supply 100 to modify the controller 140 and its behavior.

Most conventional voltage regulator chips in the market today operate based upon analog control techniques. Such conventional circuits rely on a setting of a physical compensation network for their control function. These components cannot be scaled in response to changing input voltage or changing number of phases.

In addition to adjusting one or more digital control coefficients and/or digital filter parameter settings as discussed above, embodiments herein can include further adjusting the control coefficients in accordance with the methods as discussed below in FIGS. 14 through 19. Both methods maintain stability over a range of active phases.

Figure 14:
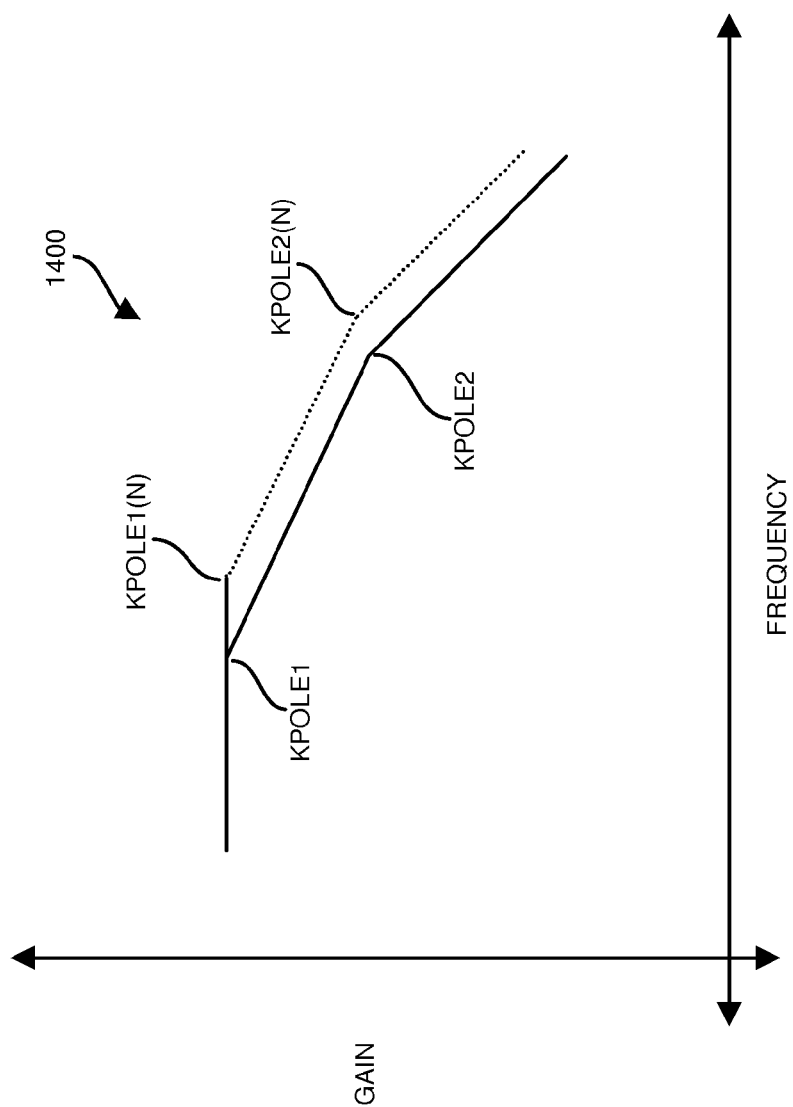
FIG. 14 is an example diagram illustrating adjustment of poles according to embodiments herein.

Now, more specifically, FIG. 14 is an example theoretical graph 1400 illustrating open loop gain associated with the power supply 100 when operating in the third mode (e.g., resonant frequency adjustment mode) according to embodiments herein.

Operating in the resonant frequency adjustment mode can include: i) adjusting the control coefficients (e.g., Kp, Ki, Kd, and Kf) via control coefficient modifier 132 and ii) adjusting a cutoff frequency of filters 1330 via filter parameter adjustment circuit 1327 as follows:

Kp'=Kp/√n, (the component P is scaled down by √n to compensate for an increased open loop gain, this increases the zeros), Ki'=Ki, Kd'=Kd/n, Kpole1(n)=Kpole1*√n. Note that Kpole1 is a filter pole in the compensator transfer function, Kpole2(n)=Kpole2*√n. Note that Kpole2 is a filter pole in the compensator transfer function, where n=number of active phases.

As mentioned, the value of n or N (i.e., number of phases to be activated) is inputted to both gain coefficient adjustment circuit 210 and filter parameter setting adjustment circuit 1327. The gain coefficient adjustment circuit 210 controls settings of the gain coefficients as discussed above. The filter parameter setting adjustment circuit 1327 controls settings of filter circuits 1330. Thus, the configuration of the control signal generator 1334 (i.e., power supply control circuitry) varies depending on a number of activated phases. As previously discussed, the settings can also depend on the magnitude of voltage, Vin.

FIG. 14 is an example diagram illustrating modification of poles (e.g., shifting of poles based on √n) according to embodiments herein. Graph 1400 illustrates how scaling of the coefficients in the filter circuits 1330 affects the compensator transfer function in the third mode when a different number of phases are active producing the output voltage.

As mentioned, the resonant frequency of the power supply changes by a factor of 1/√n. Adjustment of the setting of poles by this factor (as shown in FIG. 14) effectively causes the adjusted control parameters (e.g., any poles and or zeros) to track the change in the resonant frequency of the power supply depending on a number of activated phases.

Additionally, to account for an increase in an open loop gain of the power supply 100 when more phases are activated to simultaneously provide current to a respective load 118, embodiments herein include scaling (or dividing) default value Kp down by the square root of the number of active phases, (i.e. √n), to produce the gain coefficient Kp'. In other words, the gain Kp' for the P-component can be set to a value substantially equal to default value Kp/√n. Thus, proportionally adjusting the at least one setting of the power supply control circuitry can includes dividing a gain setting in the power supply control circuitry by a square root of the number of phases.

Also, while in this third mode of proportionally adjusting parameters based on the change in resonant frequency, the control coefficient modifier 132 can be configured to scale down or divide default coefficient, Kd, by the number of activated phases to produce coefficient Kd'.

Figure 15:
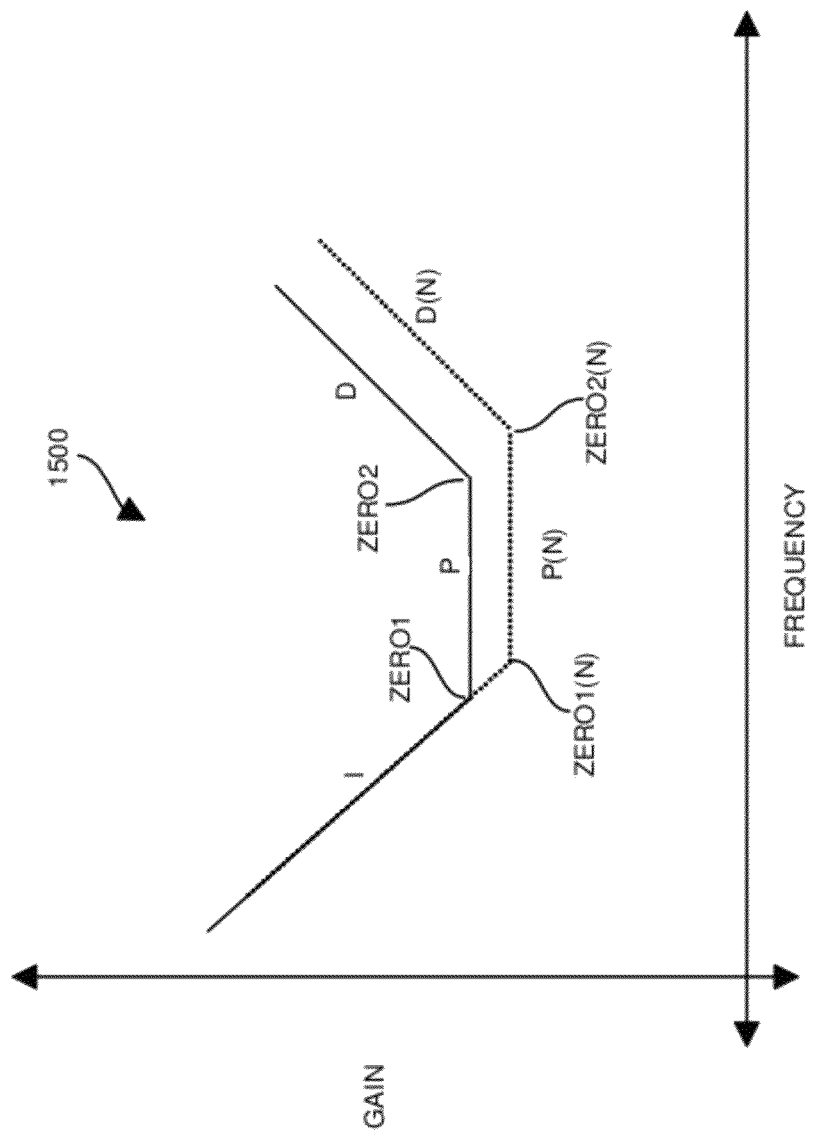
FIG. 15 is an example diagram illustrating adjustment of zeros according to embodiments herein.

FIG. 15 is an example diagram illustrating modification of zeros according to embodiments herein. As shown in graph 1500 of FIG. 15, the zero frequencies ZERO1 and ZERO2 are adjusted to track the resonant frequency as the number of active phase increases.

Figure 16:
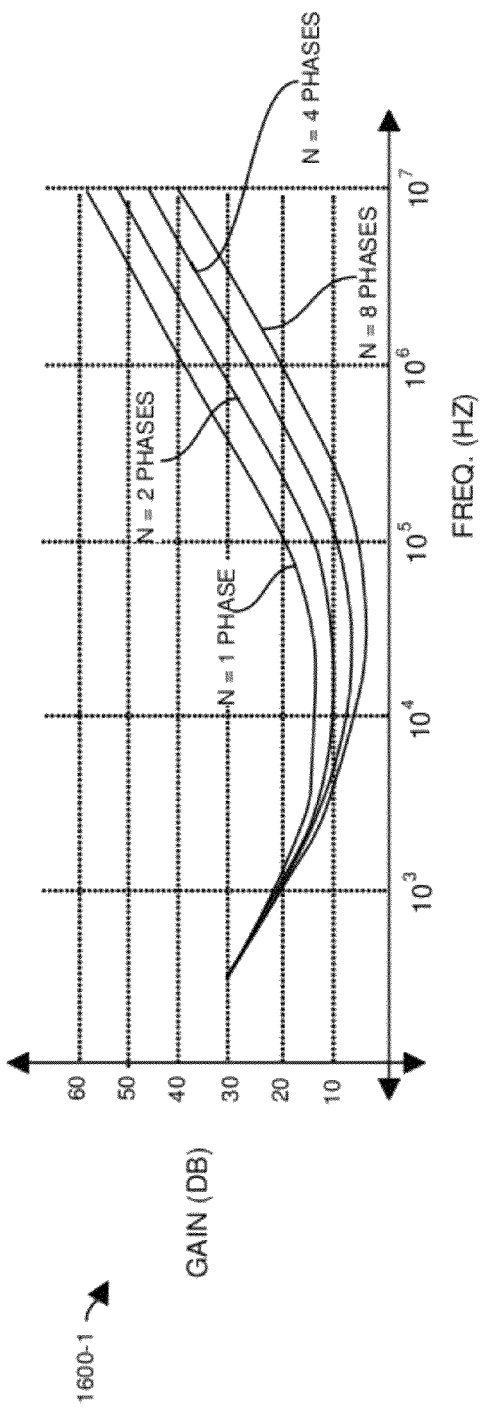
FIG. 16 is an example diagram illustrating a theoretical PID compensator circuit transfer function for a third mode according to embodiments herein.
Figure 16:
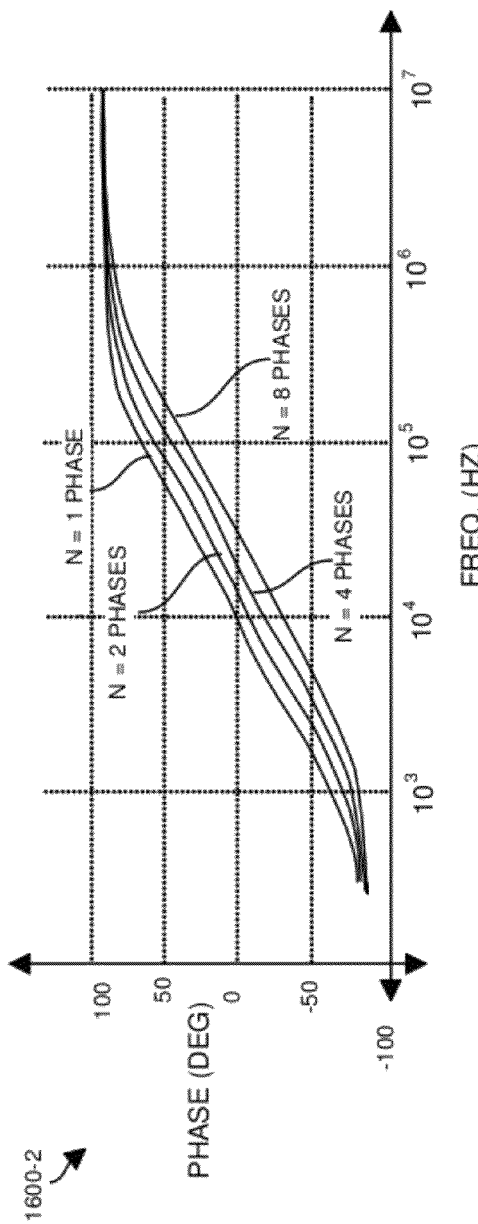

FIG. 16 is diagram including example theoretical graphs 1600 (e.g., graph 1600-1 and graph 1600-2) illustrating variation of a PID compensator circuit transfer function depending on a number of activated phases for the resonant frequency adjustment mode according to embodiments herein.

As previously discussed, and as shown in graph 1500, via adjusting control coefficients Kp and Kd and poles and zeroes in this third mode, the controller 140 adjusts a PID compensator transfer function depending on whether 1, 2, 4, 8, etc., phases are activated in the power supply 100.

Figure 17:
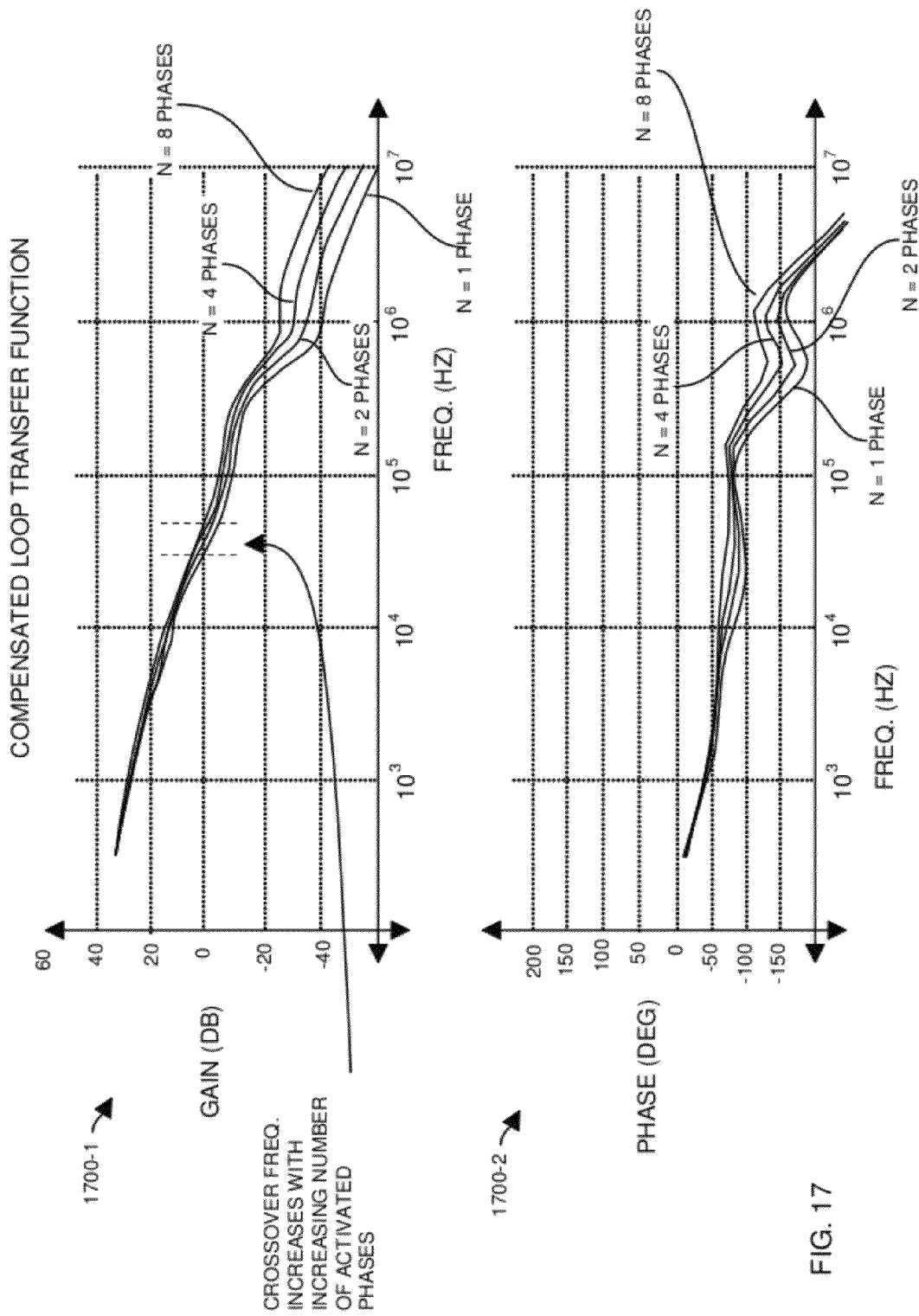
FIG. 17 is an example diagram illustrating a theoretical compensated loop transfer function associated with the third mode according to embodiments herein.

FIG. 17 is a diagram including example theoretical graphs 1700 (e.g., graph 1700-1 and 1700-2) illustrating a compensated loop transfer function of power supply 100 (as discussed in FIG. 4) for the resonant frequency adjustment mode according to embodiments herein.

As shown, as the number of phases increase, the crossover frequency increases, increasing an overall responsiveness of the regulator when more phases are activated. Also, adequate phase and gain margin are maintained to ensure stability. Bandwidth increases and increases responsiveness of the regulation associated with the power supply.

The phase margin is greater than 45 degrees regardless of the number of active phases. The gain margin is also greater than 10 dB regardless of the number of active phases. Accordingly, the power supply 100 is operationally stable over a range of different activated phases.

Figure 18:
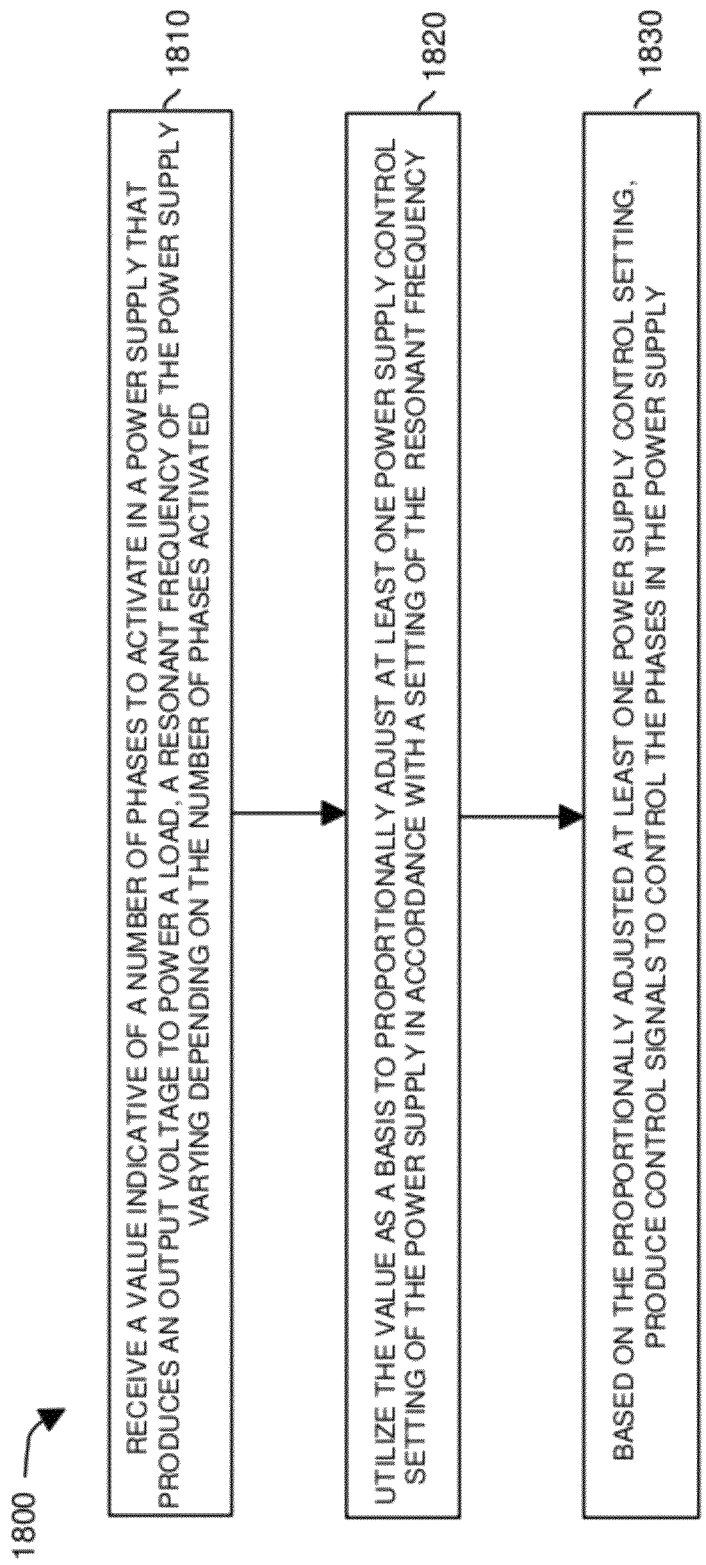
FIGS. 18 and 19 are flowcharts illustrating example methods according to embodiments herein.

FIG. 18 is a flowchart 1800 illustrating an example method of controlling operation of a power supply 100 according to embodiments herein. Note that there will be some overlap with respect to concepts as discussed above. Also, the steps can be executed in any suitable order.

In step 1810, the parameter adjustment circuit (e.g., parameter setting adjustment circuit 1327 and/or gain control adjustment circuit 1310) receives a value indicative of a number of phases, n, to activate in a power supply that produces an output voltage to power a load 118. The resonant frequency of the power supply 100 varies depending on the number of phases (to be) activated.

In step 1820, the parameter adjustment circuit utilizes the value (at least in part) as a basis to proportionally adjust at least one power supply control setting of the power supply in accordance with the setting of the resonant frequency of the power supply 100. By way of a non-limiting example, the parameter adjustment circuit can adjustment a parameter setting to proportionally track the change in resonant frequency that occurs when switching from activation of a first number of phases to activation of a second number of phases.

In step 1830, based on the proportionally adjusted at least one power supply control setting, the control signal generator 1334 of power supply 100 produces one or more phase control signals to control the active phases in the power supply 100.

Figure 19:
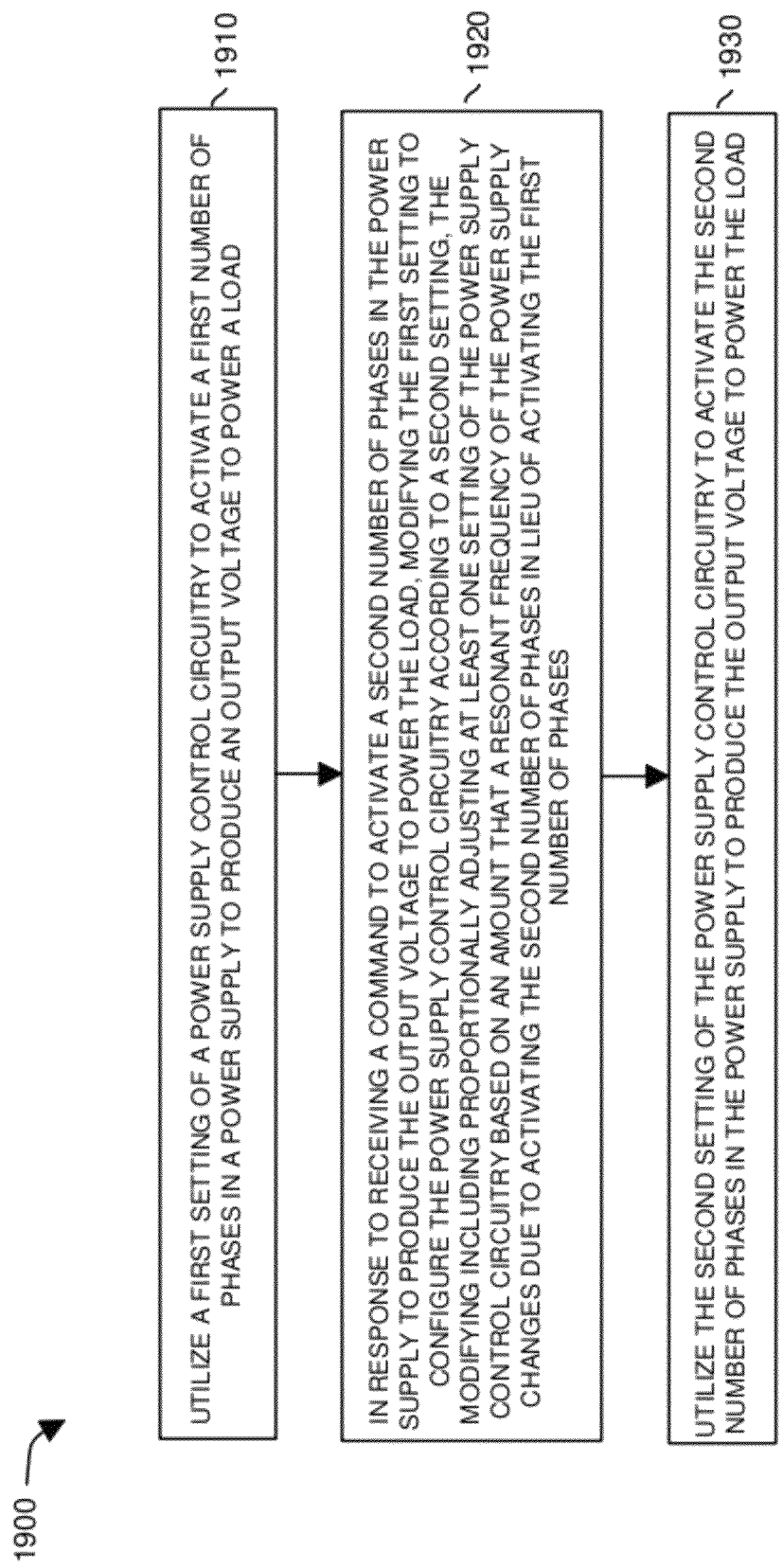

FIG. 19 is a flowchart 1900 illustrating an example method of controlling operation of a power supply 100 according to embodiments herein. Note that there will be some overlap with respect to concepts as discussed above. Also, the steps can be executed in any suitable order.

In step 1910, the control signal generator 1334 utilizes a first setting of a power supply control circuitry (e.g., the PID compensator, filter circuits comparator, etc.) to activate a first number of phases (e.g., n1 phases) in a power supply to produce an output voltage to power load 118.

In step 1920, in response to receiving a command to activate a second number of phases (e.g., n2 phases) in the power supply 100 to produce the output voltage to power the load 118, the control signal generator modifies the first setting to configure the power supply control circuitry according to a second setting. Modifying the setting of the circuitry in the control signal generator 1334 can include proportionally adjusting at least one setting of the power supply control circuitry based on an amount that a resonant frequency of the power supply 100 changes due to activating the second number of phases in lieu of activating the first number of phases.

In step 1930, the control signal generator 1334 utilizes the second setting of the power supply control circuitry to activate the second number of phases (e.g., n2 phases) in the power supply 100 to produce the output voltage to power the load 118.

Note again that techniques herein are well suited for use in power supply applications. However, it should be noted that embodiments herein are not limited to use in such applications and that the techniques discussed herein are well suited for other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

I claim:

1. A method comprising:
    receiving a value indicative of a number of phases to activate in a power supply that produces an output voltage to power a load, wherein a resonant frequency of the power supply varies depending on the number of phases activated;
    utilizing the value as a basis to proportionally adjust at least one power supply control setting of a PID compensator circuit in the power supply in accordance with the number of phases, variations in the number of phases activated changing a setting of the resonant frequency; and
    based on the proportionally adjusted at least one power supply control setting of the PID compensator circuit, producing control signals to control the phases in the power supply.

2. The method as in claim 1, wherein utilizing the value as a basis to proportionally adjust the at least one control setting comprises:
    proportionally adjusting a magnitude of the at least one power supply control setting by a factor of 1 divided by a square root of the value.

3. The method as in claim 1, wherein utilizing the value as a basis to proportionally adjust the at least one power supply control setting comprises:
    proportionally adjusting a cutoff frequency of at least one filter circuit in the power supply by a factor of square root of the value to track a change in the resonant frequency resulting from activating the number of phases as specified by the value.

4. The method as in claim 1, wherein utilizing the value to proportionally adjust the at least one control setting comprises:
    proportionally adjusting a setting of a pole in at least one filter circuit in the power supply by a factor of square root of the value to track a change in the resonant frequency resulting from activating the number of phases as specified by the value.

5. The method as in claim 1, wherein utilizing the value as a basis to proportionally adjust at least one power supply control setting includes:
    proportionally adjusting a first gain associated with a proportional function in the PID compensator circuit based on a change in the resonant frequency of the power supply resulting from activation of the number of phases, wherein the proportional function produces first signal; and
    utilizing the value to adjust a second gain associated with a differential function in the PID compensator circuit, wherein the differential function produces a second signal.

6. The method as in claim 5 further comprising:
    producing a sum based on summing at least the first signal and the second signal;
    inputting the sum into a filter circuit;
    adjusting a setting of a pole of the filter circuit based on an inverse square root of the value; and
    utilizing an output of the filter circuit at least in part to produce the control signals.

7. The method as in claim 1 further comprising:
    proportionally adjusting an open loop gain of the power supply in accordance with a setting of the resonant frequency resulting from activating the number of phases to produce the output voltage.

8. The method as in claim 1, wherein producing the control signals comprises:
    proportionally modifying a cutoff frequency of a first filter circuit based at least in part on a setting of the resonant frequency of the power supply for the number of phases to be activated; and
    utilizing the first filter circuit to filter an error voltage inputted to the PID compensator circuit in the power supply.

9. The method as in claim 8 further comprising:
    modifying a cutoff frequency of a second filter circuit based at least in part on the setting of the resonant frequency of the power supply for the number of phases to be activated; and
    utilizing the second filter circuit to filter an output of the PID compensator circuit, the output of the PID compensator circuit used at least in part to produce the control signals.

10. The method as in claim 1, wherein utilizing the value to proportionally adjust the at least one control setting comprises:
    proportionally adjusting the at least one control setting to account for a change in the resonant frequency resulting from activating the number of phases as specified by the value.

11. A method comprising:
    receiving a value indicative of a number of phases to activate in a power supply that produces an output voltage to power a load, wherein a resonant frequency of the power supply varies depending on the number of phases activated;
    utilizing the value as a basis to proportionally adjust at least one power supply control setting of a PID compensator circuit in the power supply in accordance with the number of phases activated, variations in the number of phases activated changing a setting of the resonant frequency; and
    based on the proportionally adjusted at least one power supply control setting of the PID compensator circuit, producing control signals to control the phases in the power supply;
    wherein utilizing the value as a basis to proportionally adjust at least one power supply control setting comprises:
    adjusting a magnitude of at least one gain coefficient in the power supply based on the value so that a crossover frequency of the power supply increases for an increased number of phases that are activated to produce the output voltage.

12. A method comprising:
utilizing a first setting of a power supply control circuitry to activate a first number of phases in a power supply to produce an output voltage to power a load;
in response to receiving a command to activate a second number of phases in the power supply to produce the output voltage to power the load, modifying the first setting to configure the power supply control circuitry according to a second setting, wherein the modifying includes proportionally adjusting at least one setting of the power supply control circuitry based on an amount that a resonant frequency of the power supply changes due to activating the second number of phases in lieu of activating the first number of phases; and
utilizing the second setting of the power supply control circuitry to activate the second number of phases in the power supply to produce the output voltage to power the load, wherein the second setting proportionally adjusts an open loop gain of the power supply to account for the amount of change in the resonant frequency.

13. The method as in claim 12, wherein proportionally adjusting the at least one setting of the power supply control circuitry includes modifying at least one pole setting of a filter circuit in the power supply control circuitry, the at least one pole setting adjusted based on a square root of the second number of phases.

14. The method as in claim 12, wherein proportionally adjusting the at least one setting of the power supply control circuitry includes dividing a gain setting in the power supply control circuitry by a square root of the second number of phases.

15. The method as in claim 12, wherein the resonant frequency of the power supply varies depending on an inductance and output capacitance of the power supply, the inductance varying depending on a number of phases activated, the output capacitance being substantially fixed regardless of the number of phases that are activated.

16. A power supply system comprising:
multiple phases;
a parameter modifier to:
receive a value indicative of a number of the multiple phases in the power supply to be activated for producing an output voltage to power a load, and
utilize the value to proportionally adjust at least one setting of a PID compensator circuit in the power supply control circuitry based at least in part on an amount that a resonant frequency of the power supply changes due to activating the number of phases; and
a control signal generator to, based on the proportionally adjusted setting of the PID compensator circuit in the power supply control circuitry, produce control signals to control the number of phases in the power supply as specified by the value to produce the output voltage.

17. The power supply system as in claim 16, wherein the parameter modifier proportionally adjusts a magnitude of the at least one power supply control setting by a factor of 1 divided by a square root of the value.

18. The power supply system as in claim 16, wherein the parameter modifier proportionally adjusts a zero frequency of at least one filter circuit in the power supply control circuitry to track a change in the resonant frequency resulting from activating the number of phases as specified by the value.

19. The power supply system as in claim 16, wherein the parameter modifier proportionally adjusts a setting of a pole in at least one filter circuit in the power supply to track a change in the resonant frequency resulting from activating the number of phases as specified by the value.

20. The power supply system as in claim 16, wherein the parameter modifier proportionally adjusts an open loop gain of the power supply in accordance with a change in the resonant frequency resulting from activating the number of phases to produce the output voltage.

21. The power supply system as in claim 16, wherein the parameter modifier proportionally adjusts an open loop gain of the power supply in accordance with the activated number of phases to produce the output voltage.

22. The power supply system as in claim 16, wherein the parameter modifier adjusts a magnitude of at least one gain coefficient of the PID compensator in the power supply based on the number of activated phases so that a crossover frequency of the power supply increases for an increased number of phases that are activated to produce the output voltage.

* * * * *